(12) United States Patent
Bonnat

(10) Patent No.: US 9,904,353 B2
(45) Date of Patent: Feb. 27, 2018

(54) MOBILE HANDSET ACCESSORY SUPPORTING TOUCHLESS AND OCCLUSION-FREE USER INTERACTION

(71) Applicant: Pierre Bonnat, Butschwill (CH)

(72) Inventor: Pierre Bonnat, Butschwill (CH)

( * ) Notice: Subject to any disclaimer, the term of this patent is extended or adjusted under 35 U.S.C. 154(b) by 0 days.

(21) Appl. No.: 13/848,043

(22) Filed: Mar. 20, 2013

(65) Prior Publication Data

US 2013/0335315 A1    Dec. 19, 2013
US 2016/0328013 A9    Nov. 10, 2016

Related U.S. Application Data

(63) Continuation-in-part of application No. 13/348,537, filed on Jan. 11, 2012, now Pat. No. 8,943,889, which is a continuation-in-part of application No. 12/055,999, filed on Mar. 26, 2008, now Pat. No. 8,976,046, and a continuation-in-part of application No. 12/056,203, filed on Mar. 26, 2008.

(60) Provisional application No. 61/613,402, filed on Mar. 20, 2012, provisional application No. 61/436,506, filed on Jan. 26, 2011, provisional application No. 61/431,716, filed on Jan. 11, 2011.

(51) Int. Cl.
   *G06F 3/01*      (2006.01)
   *H04M 1/2745*    (2006.01)
   *H04M 1/725*     (2006.01)
   *G06F 1/16*      (2006.01)

(52) U.S. Cl.
   CPC ............. *G06F 3/01* (2013.01); *G06F 1/1628* (2013.01); *G06F 3/011* (2013.01); *H04M 1/27455* (2013.01); *H04M 1/72522* (2013.01); *G06F 2200/1633* (2013.01); *H04M 2250/12* (2013.01)

(58) Field of Classification Search
   CPC .......... G06F 3/011; G06F 3/03; G06F 1/3215; G10H 2220/361; G05B 2219/23386
   USPC .......... 345/156; 700/83; 702/45, 48; 335/306
   See application file for complete search history.

(56) References Cited

U.S. PATENT DOCUMENTS

| 5,422,640 | A  | * | 6/1995 | Haley ............................ 341/21 |
| 6,421,617 | B2 | * | 7/2002 | Felsenstein et al. ........... 702/50 |
| 6,574,571 | B1 | * | 6/2003 | Bonnat ........................... 702/48 |
| 6,608,399 | B2 | * | 8/2003 | McConnell et al. ......... 307/10.1 |
| 7,739,061 | B2 | * | 6/2010 | Bonnat ........................... 702/48 |
| 8,264,310 | B2 | * | 9/2012 | Lauder et al. ................ 335/219 |
| 8,635,091 | B2 | * | 1/2014 | Amigo et al. ................... 705/4 |
| 8,638,364 | B2 | * | 1/2014 | Chen et al. ................... 348/135 |
| 8,701,015 | B2 | * | 4/2014 | Bonnat ......................... 715/744 |
| 8,943,889 | B2 | * | 2/2015 | Bonnat ....................... 73/272 R |

(Continued)

OTHER PUBLICATIONS

PCT, International Search Report and the Written Opinion of the International Searching Authority, in Application No. PCT/IB2013/001257, dated Oct. 31, 2013. (11 pages).

(Continued)

*Primary Examiner* — Peter D McLoone
(74) *Attorney, Agent, or Firm* — McAndrews, Held & Malloy, Ltd.

(57) ABSTRACT

An accessory device for handheld electronic devices such as, for example, a cellular telephone, a smart phone, a media player, and a tablet computer includes circuitry for sensing flow of human breath and for communicating with the handheld electronic device, to enable user control of the handheld electronic device employing the flow of human breath.

15 Claims, 24 Drawing Sheets

(56) References Cited

U.S. PATENT DOCUMENTS

| | | | |
|---|---|---|---|
| 8,976,046 B2* | 3/2015 | Bonnat | 341/34 |
| 2002/0016687 A1* | 2/2002 | Felsenstein et al. | 702/45 |
| 2002/0140289 A1* | 10/2002 | McConnell et al. | 307/10.1 |
| 2004/0079686 A1* | 4/2004 | Moscaritolo | B01D 29/603 210/90 |
| 2006/0142957 A1* | 6/2006 | Bonnat | G06F 3/002 702/50 |
| 2008/0154535 A1* | 6/2008 | Sparks | G05B 19/0425 702/130 |
| 2008/0177404 A1* | 7/2008 | Bonnat | 700/90 |
| 2009/0082884 A1* | 3/2009 | Bonnat | 700/83 |
| 2009/0241686 A1* | 10/2009 | Bonnat | 73/861.08 |
| 2009/0244003 A1* | 10/2009 | Bonnat | 345/157 |
| 2009/0247222 A1* | 10/2009 | Bonnat | 455/557 |
| 2009/0249202 A1* | 10/2009 | Bonnat | 715/700 |
| 2009/0322675 A1* | 12/2009 | Bonnat | 345/157 |
| 2010/0079370 A1 | 4/2010 | Kim | |
| 2010/0093401 A1* | 4/2010 | Moran et al. | 455/566 |
| 2010/0277304 A1 | 11/2010 | Haartsen | |
| 2011/0004327 A1 | 1/2011 | Bonnat | |
| 2011/0010112 A1* | 1/2011 | Bonnat | 702/48 |
| 2011/0137433 A1 | 6/2011 | Bonnat | |
| 2011/0153367 A1* | 6/2011 | Amigo et al. | 705/4 |
| 2011/0178613 A9* | 7/2011 | Bonnat | 700/83 |
| 2012/0068798 A1* | 3/2012 | Lauder et al. | 335/306 |
| 2012/0075463 A1* | 3/2012 | Chen et al. | 348/135 |
| 2012/0081405 A1* | 4/2012 | Bonnat | 345/661 |
| 2012/0186338 A1* | 7/2012 | Bonnat | 73/272 R |
| 2012/0192121 A1* | 7/2012 | Bonnat | 715/863 |
| 2013/0060355 A9* | 3/2013 | Bonnat | 700/83 |
| 2014/0103789 A1* | 4/2014 | Cox, III | 312/280 |
| 2014/0128132 A1* | 5/2014 | Cox, III | 455/575.8 |
| 2014/0187295 A1* | 7/2014 | Kumar et al. | 455/575.1 |
| 2014/0311238 A9* | 10/2014 | Bonnat | 73/272 R |
| 2014/0350367 A1* | 11/2014 | Subramaniam | 600/340 |
| 2015/0073619 A1* | 3/2015 | Naboulsi | 701/1 |

OTHER PUBLICATIONS

PCT, International Search Report and the Written Opinion of the International Searching Authority, in Application No. PCT/IB2013/001257, dated Jan. 24, 2014. (12 pages).

* cited by examiner

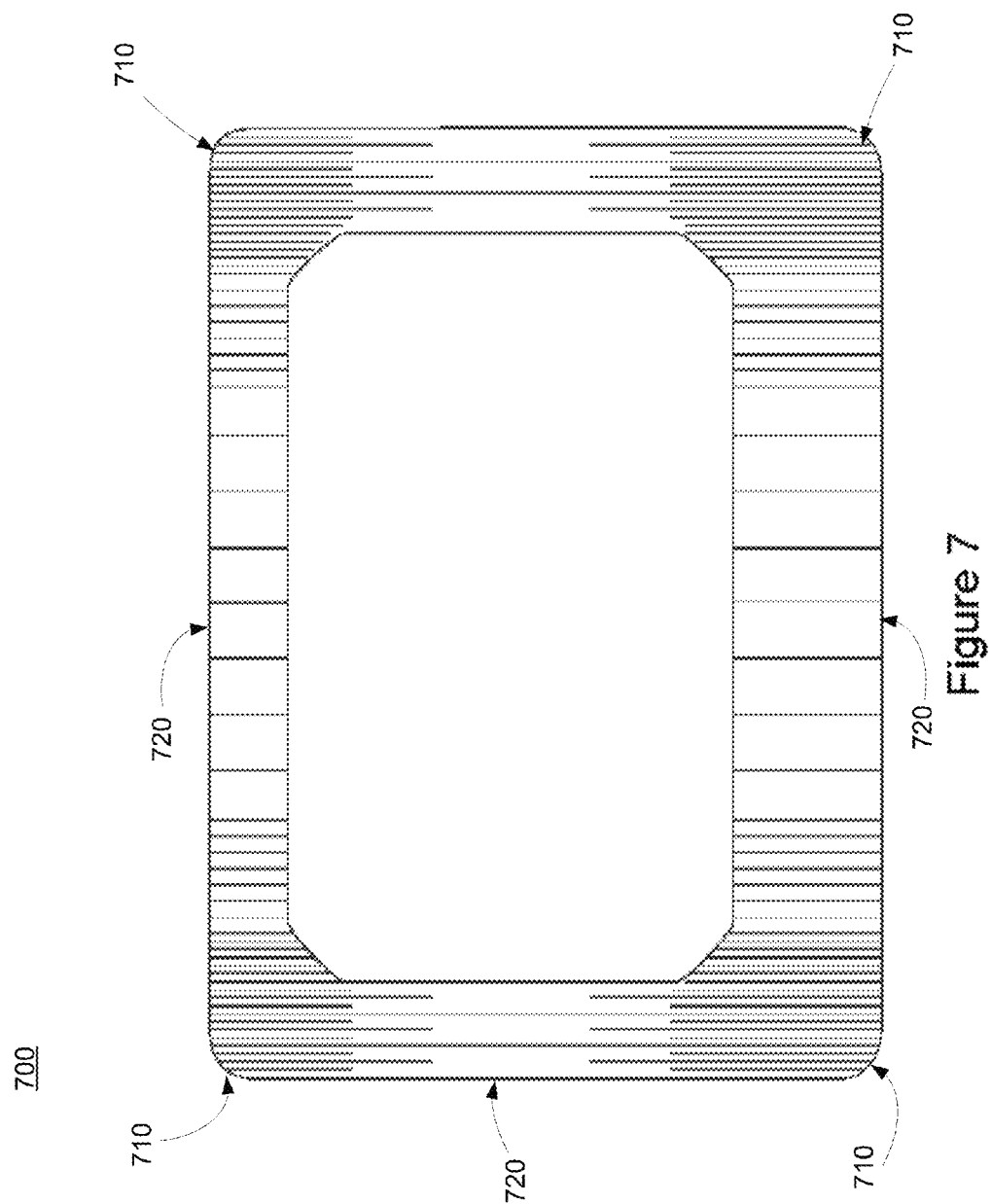

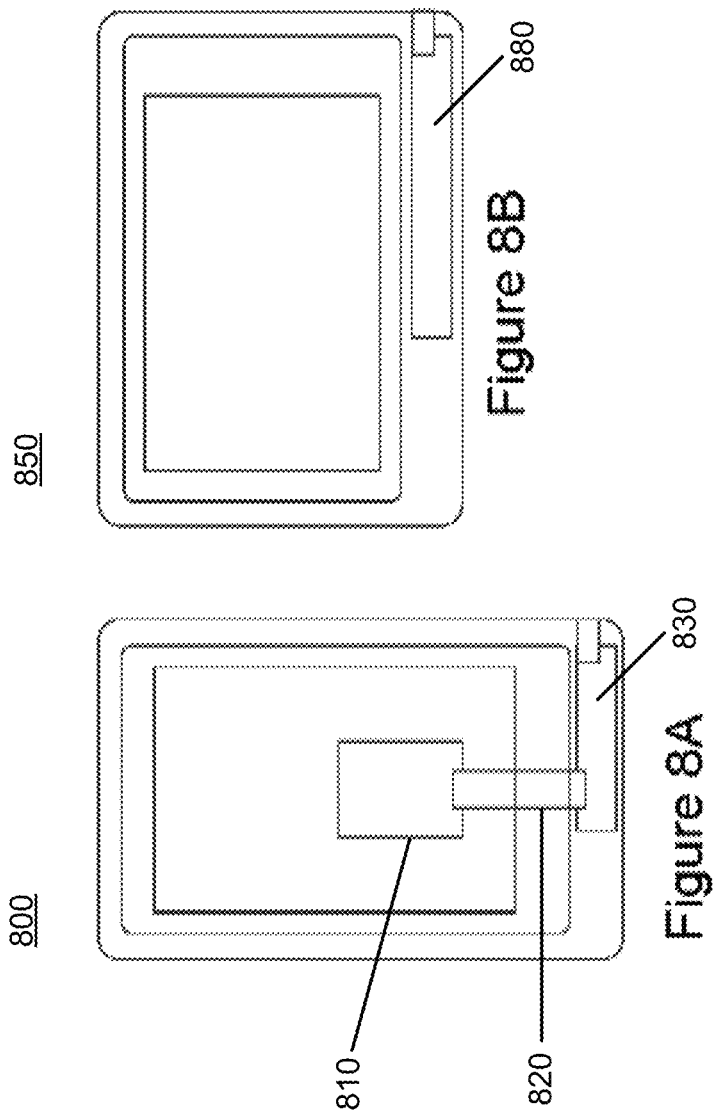

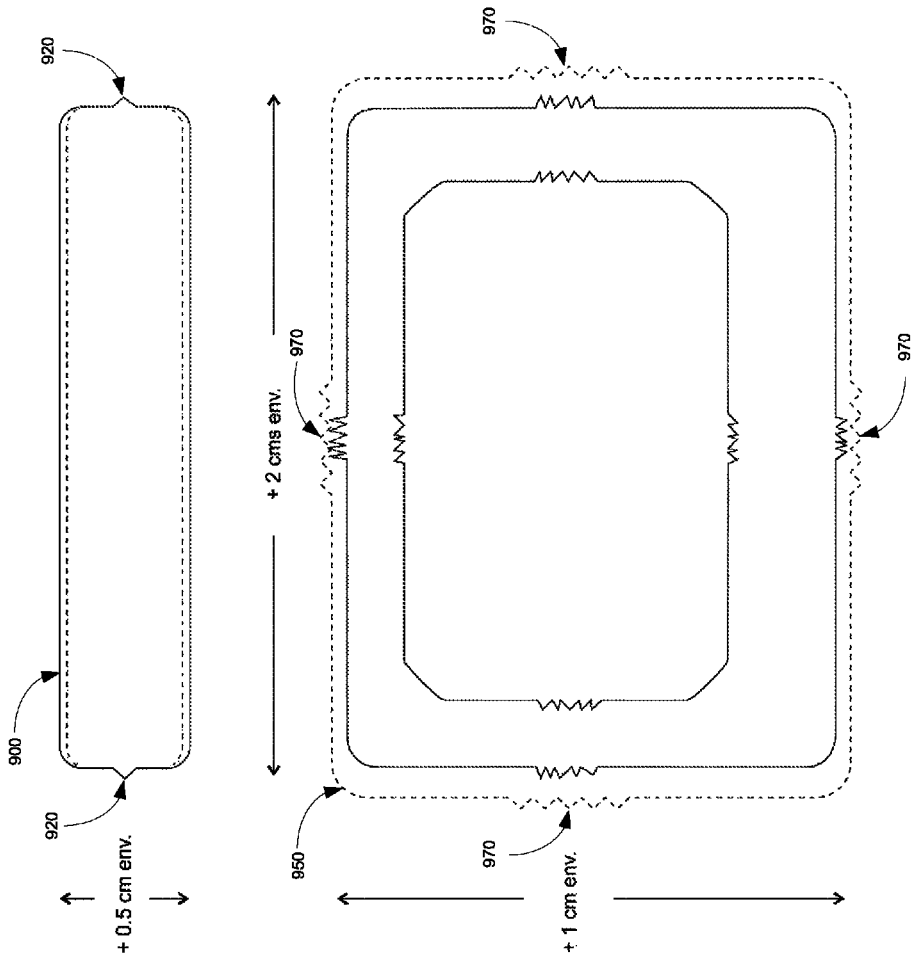

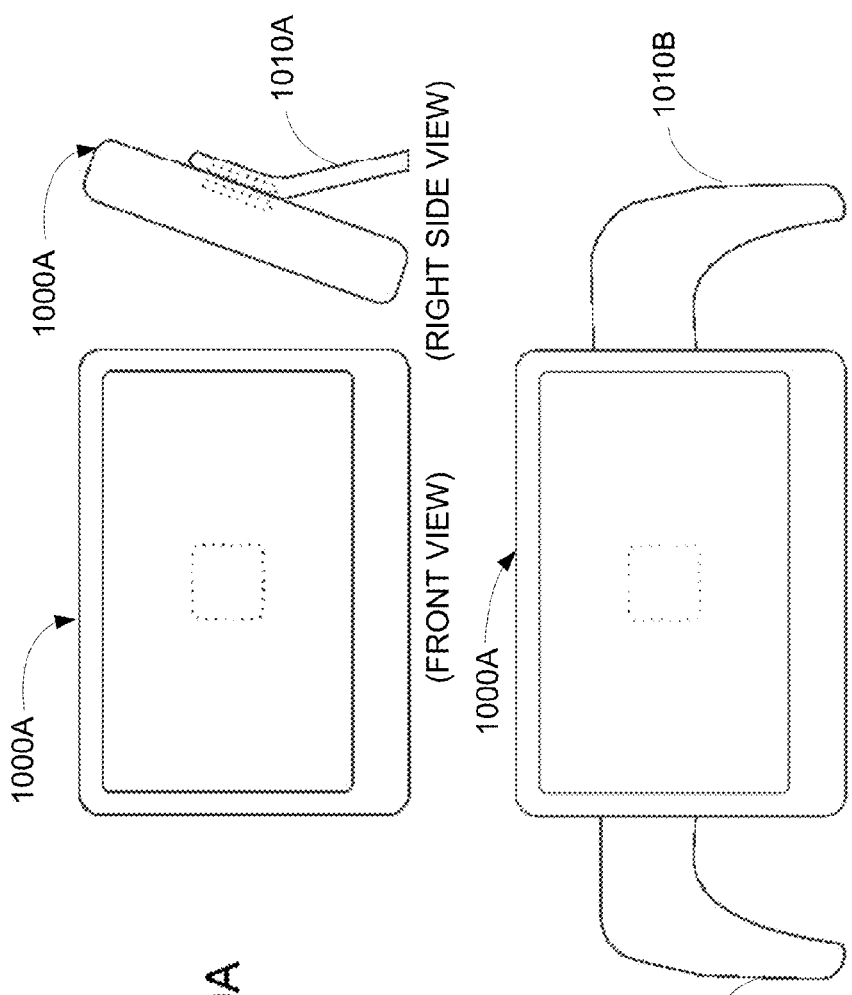

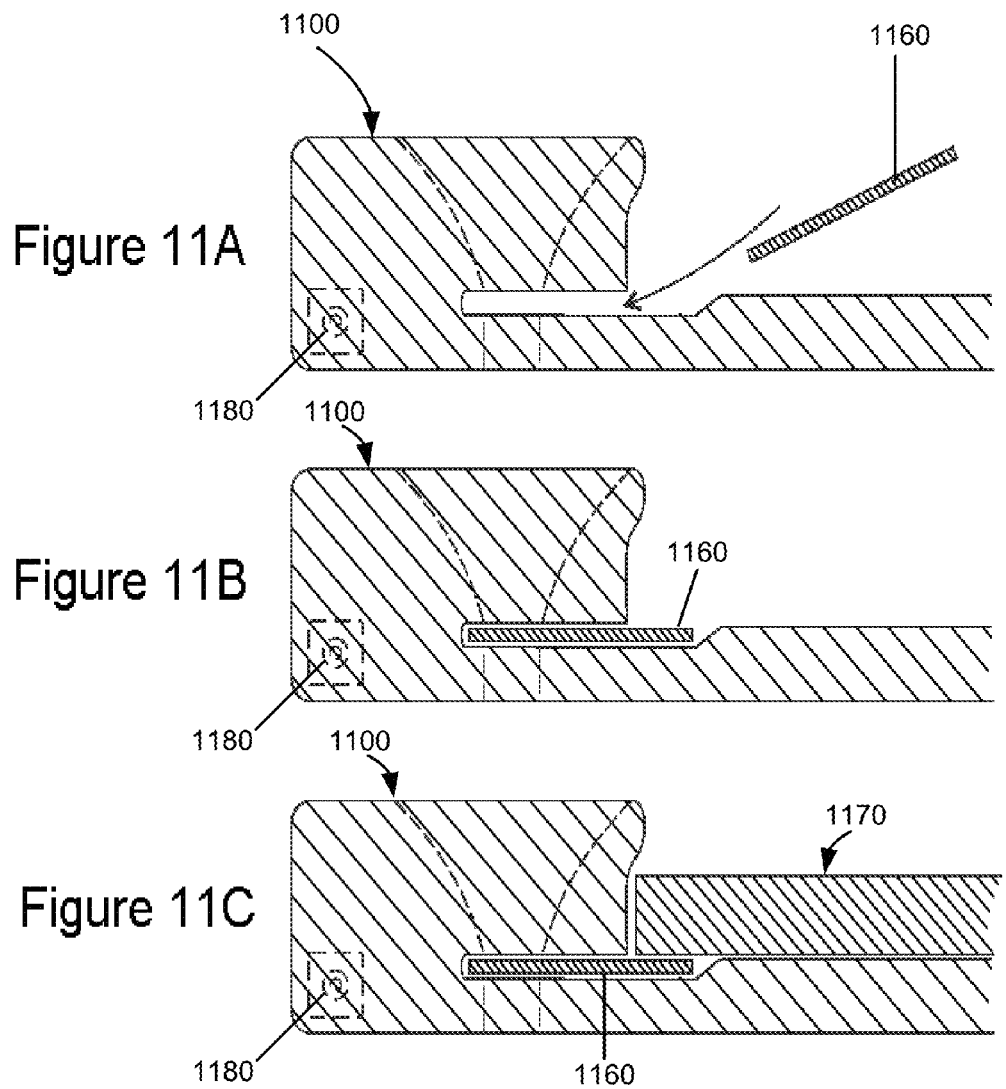

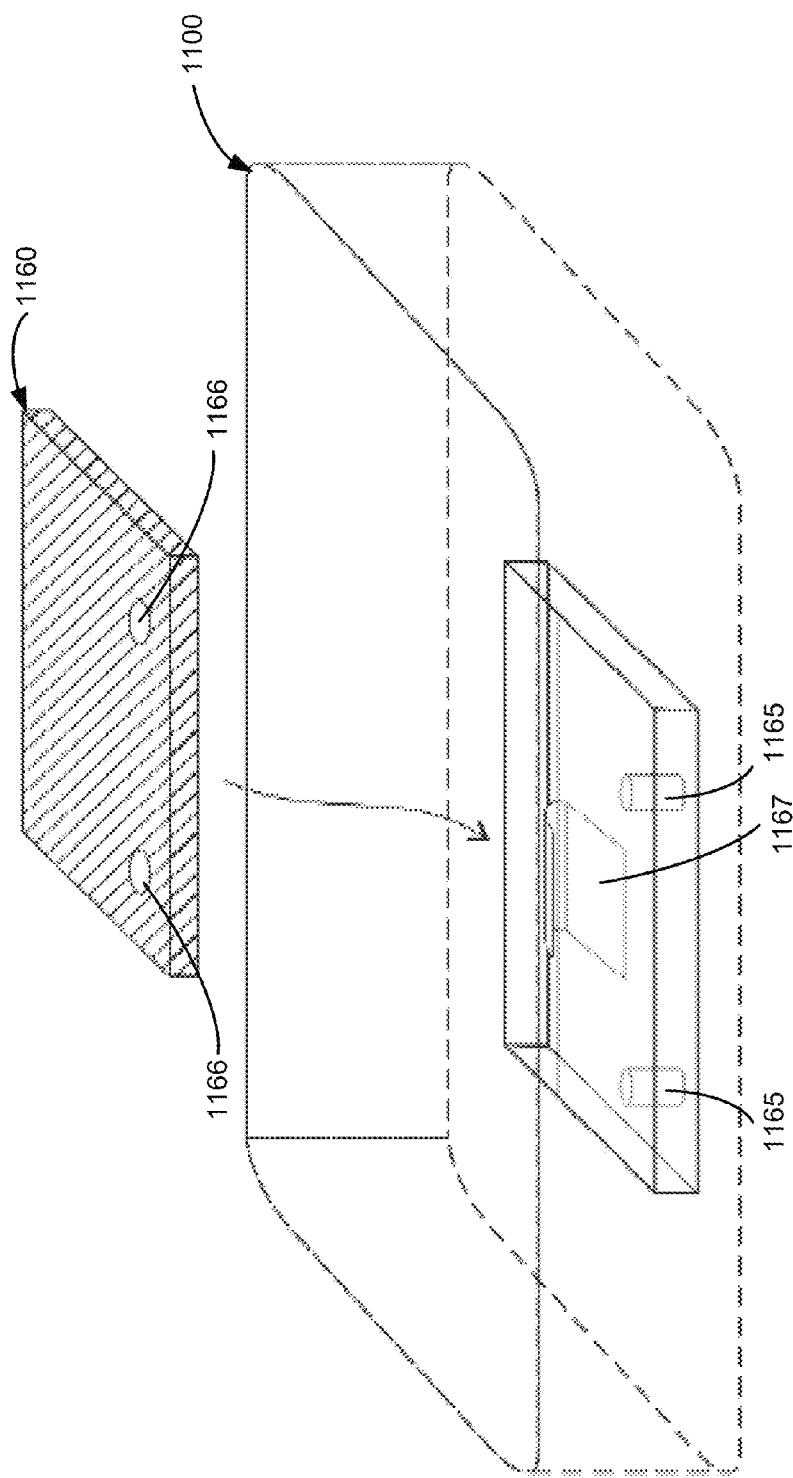

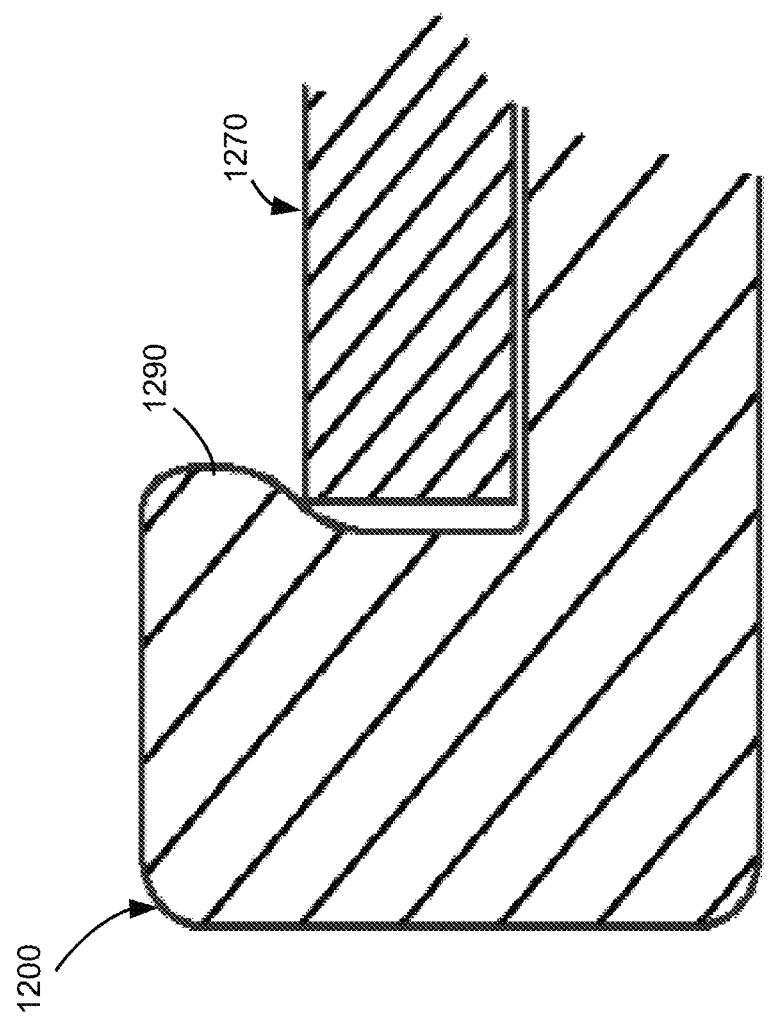

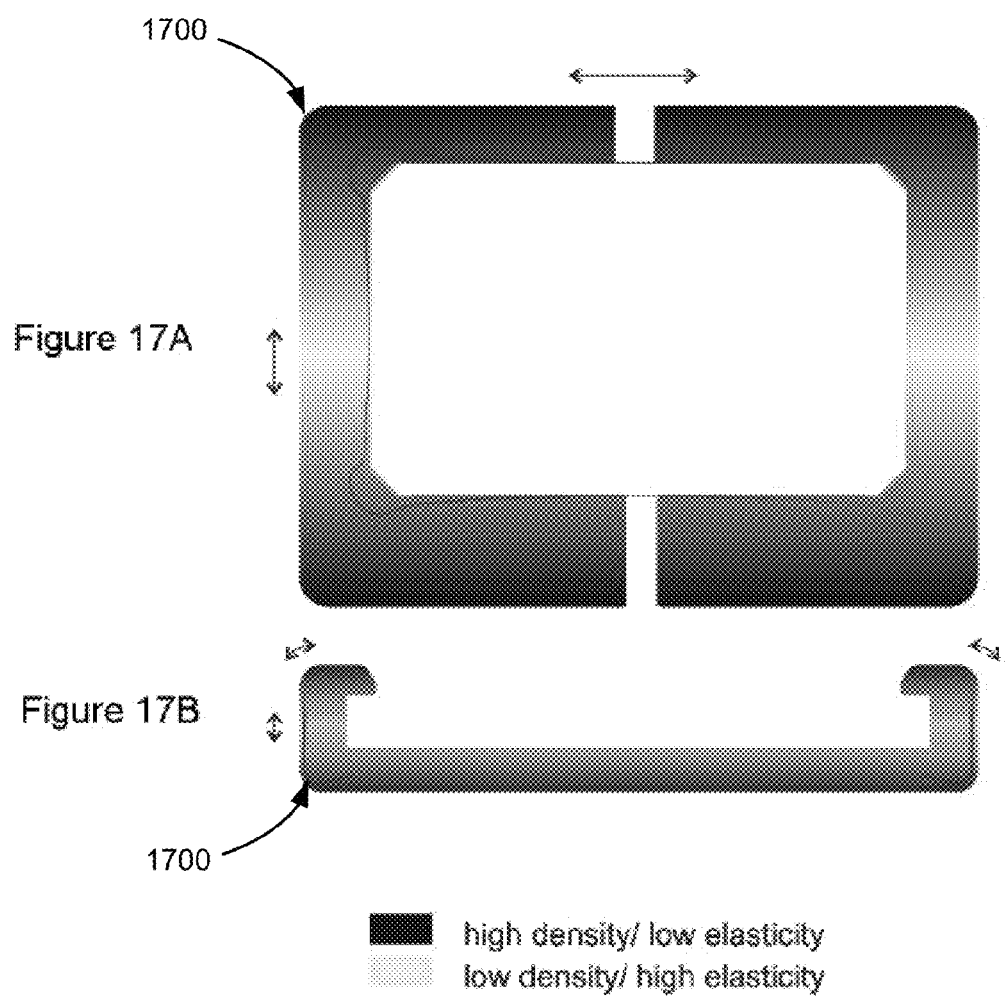

MOBILE HANDSET ACCESSORY SUPPORTING TOUCHLESS AND OCCLUSION-FREE USER INTERACTION

RELATED APPLICATIONS

The present application makes reference to, claims benefit of, and claims priority to U.S. Provisional Patent Application No. 61/613,402, filed Mar. 20, 2012, and is a continuation in part of U.S. patent application Ser. No. 13/348,537, filed Jan. 11, 2012, which makes reference to, claims benefit of, and claims priority to U.S. Provisional Patent Application No. 61/436,506, filed Jan. 26, 2011 and U.S. Provisional Patent Application No. 61/431,716, filed Jan. 11, 2011, and which is a continuation in part of U.S. patent application Ser. No. 12/055,999, filed Mar. 26, 2008, and a continuation in part of U.S. patent application Ser. No. 12/056,203, filed Mar. 26, 2008. The complete subject matter of each of U.S. Provisional Patent Application No. 61/613,402, U.S. patent application Ser. No. 12/055,999, and U.S. patent application Ser. No. 13/348,537, which is hereby incorporated herein by reference, in its respective entirety.

FEDERALLY SPONSORED RESEARCH OR DEVELOPMENT

[Not Applicable]

BACKGROUND OF THE INVENTION

Handheld electronic devices such as cellular telephones, smart phones, media players, tablet computers, and the like, generally have display screens of fairly small dimension, e.g., 3-10" diagonal dimension.

Touch screen interfaces continue to be an increasingly popular feature in handheld electronic devices, as they eliminate the need for separate input devices. Although use of the fingers to manipulate displayed content by, for example, pointing, flicking, pinching, and spreading of the fingers may be learned quickly and quite naturally, the fingers of a user frequently block the user's ability to see the display content on the screen. Occlusion of screen content by a user's finger(s) on a touch sensitive screen can result in user frustration due to unintentional "clicks" or selection, missing of status messages, missed targets, inefficient user motions or movements, and forcing the user into awkward postures. Further, such manipulations may interfere with experiencing the illusion desired by the creators of the user interface, resulting in a reduction in the enjoyment of the user. For example, obtrusive forms of interaction may hinder engaging the user in the illusions that may be enabled by Augmented Reality applications.

In addition, some user interfaces may involve the use of two hands, which may be difficult or even dangerous in certain situations where one hand is already occupied, as may occur while driving, or when a commuter stands while riding on a train.

Users of handheld electronic devices such as the types of devices mentioned above frequently purchase one or both of a screen protector and an add-on protective cover, for physical protection of the device. A screen protector is a transparent overlay that is applied to the surface of the display screen to reduce or eliminate scratching of the display screen during use. An add-on protective cover protects the body of the device while providing access to the display screen, controls, and connectors, and may be molded from an elastic material that is stretched to fit over the handheld electronic device, or may be made of one or more pieces of a hard material molded to fit around the handheld electronic device when assembled. Both of these products simply act to safeguard against damage to the handheld electronic device due to abrasion and shock, but normally do not affect or modify the use, operation, or functionality of the device when present.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus, system, and/or method is provided for an electronic accessory to a mobile device, the accessory incorporating a breath-sensitive digital interface for the sensing of flow of a fluid such as human breath, the accessory for attachment to and extension of the modes of user input by which to control the mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 7 illustrates a front view of an exemplary accessory device in which the material and design used result in areas of higher-density or thickness for increased protection and areas of lesser density or thickness for maximum elasticity, in accordance with a representative embodiment of the present invention.

FIGS. 8A and 8B illustrate an exemplary portrait mode accessory device arrangement and an exemplary landscape mode accessory device arrangement, respectively, in accordance with a representative embodiment of present invention.

FIG. 9A illustrates the possible variation in thickness of handheld electronic device that can be accommodated by an elastic or expansion region 920 of an accessory device 900, in accordance with a representative embodiment of the present invention.

FIG. 9B illustrates possible variation in length and width of handheld electronic device that can be accommodated by an elastic or expansion region of an accessory device, in accordance with a representative embodiment of the present invention.

FIG. 10A illustrates a front view and a side view of an exemplary stand that may attach to a handheld electronic device using, for example, a form of magnetic attachment, in accordance with a representative embodiment of the present invention.

FIG. 10B illustrates a front view of an exemplary stand having handles that may serve as a stand for tabletop use, in accordance with another representative embodiment of the present invention.

FIGS. 11A, 11B, and 11C illustrate a cross section view of a portion of an exemplary accessory device, showing an arrangement for insertion of a printed circuit board (PCB) into the accessory device, and the positioning of a handheld electronic device in close proximity, in accordance with a representative embodiment of the present invention.

FIG. 11G illustrates a wireframe view of a portion of an exemplary accessory device that may, for example, correspond to the accessory device of FIG. 11F, showing a cavity with locating pins and a hook-shaped bracket, and a PCB prior to insertion within the cavity, in accordance with a representative embodiment of the present invention.

FIG. 12 illustrates an exemplary embodiment of an accessory device that may correspond to, for example, the accessory devices of FIGS. 11A-11F, having a lip that is positioned above and wraps in front of the edge of a handheld electronic device such as, for example, a mobile handset, to restrain the handheld electronic device within the accessory device, in accordance with a representative embodiment of the present invention.

FIGS. 17A, 17B illustrate differences in elasticity and density of the material used in fabricating one exemplary accessory device using a polymer/elastomer, in accordance with a representative embodiment of the present invention.

DETAILED DESCRIPTION OF THE INVENTION

Figure 1:
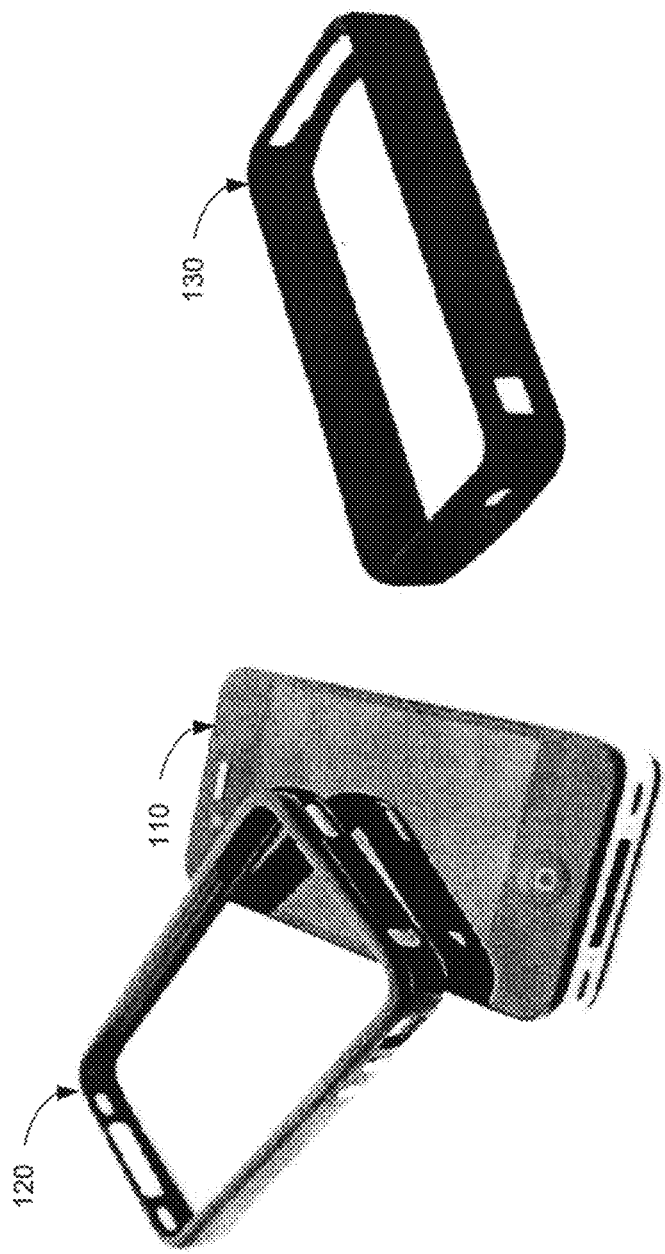
FIG. 1 illustrates a smart phone device and two prior art protective rubber bumpers for attachment to the smart phone device.

The present invention relates generally to the use of a device for sensing flow of a fluid such as human breath to enable user control of a handheld electronic device. More specifically, the present invention relates to an accessory device made to be placed upon an existing handheld electronic device, in which the accessory device incorporates a miniaturized sensor and suitable signal processing and communication circuitry to enable user control of the handheld electronic device using flow of human breath at, upon, or across the sensor of the accessory device.

A representative embodiment of the present invention integrates a micro-electromechanical system (MEMS)-based breath sensitive digital sensor for detecting flow of a fluid such as human breath, into an accessory digital fluid flow sensor device that interfaces with a handheld electronic user device, which may be referred to herein as a "host device," such as, for example, a cellular telephone, a smart phone, a media player, and a tablet computer, to name but a few possible host devices. Some representative embodiments of the present invention may be implemented in the form of, for example, a protective cover or enclosure. Other representative embodiments may not provide benefits of protection for the host device. Some representative embodiments of the present invention may be used with handheld electronic devices in a landscape orientation, while others may be arranged for handheld electronic devices that are typically used in a portrait orientation. In addition, a representative embodiment of the present invention may incorporate other sensors such as, for example, a temperature sensor, or an arrangement of one or more microphones, to further enhance the user experience.

As utilized herein, the term "exemplary" means serving as a non-limiting example, instance, or illustration. Also, as utilized herein, the term "may" is generally synonymous with the phrase "may, for example", in that such term is generally utilized to present non-limiting example illustrations. As used herein, the term "and/or" includes any and all combinations of one or more of the associated listed items.

Some representative embodiments of the present invention may electrically connect to the host device to send and/or receive one or both of data and power using an integrated electrical connector that mates with an electrical connector on the host device. Other representative embodiments may use a suitable wireless communication technology including, but not limited to, radio frequency signals such as Bluetooth® or Zigbee®, electromagnetic induction, capacitive coupling, and near field communication (NFC), to name only a few possibilities.

In one representative embodiment of the present invention, the accessory device may receive power from the host device, while in another representative embodiment, the accessory device may provide power to the host device. Such representative embodiments may be equipped with a suitable physical connector or another suitable interface to receive power for its own operation, and may have circuitry to enable such an embodiment to adapt power received from an external supply of power to that needed by the host device.

A representative embodiment of the present invention may be equipped with a rechargeable battery for operating the accessory device. In some representative embodiments, the rechargeable battery and circuitry may be of sufficient capacity and may be arranged so as to enable it to provide power needed for operating the host device as well. A representative embodiment of the present invention may have an electrical connector for receiving power from, for example, a vehicle, another piece of electrical equipment, or an adapter for converting from commercial sources of power such as that commonly available in residential or business environments. In the alternative, a representative embodiment of the present invention may receive power for operation from the host device. Power may be communicated between the host device and the accessory device by direct electrical connection, electromagnetic induction, or using radio frequency signals. In some representative embodiments, the power for operating one or both of the accessory device and the host device may be supplied by a rechargeable battery in one or both of the accessory device and the host device, or a non-rechargeable (e.g., disposable) primary battery located in the host device or the accessory device may be used as a source of operating power.

One representative embodiment of the present invention may be communicatively coupled to the host device using a wireless medium such as, for example, radio frequency (RF) communication, near-field communication (NFC), electromagnetic coupling, capacitive coupling, optical coupling, or a wired electrical connection, or any suitable combination of these technologies. A representative embodiment of the present invention may, for example, communicate with the host device using radio frequency communication based upon the BLUETOOTH® communication protocol. The BLUETOOTH® communication protocol communicates using radio frequency signals at 2.45 GHz, and has a practical operating range of up to 30 meters. Additional information about the specifics of the BLUETOOTH® Standard may be found at <http://www.bluetooth.com/Pages/Bluetooth-Home.aspx>.

Another representative embodiment of the present invention may employ near field communication to permit the accessory device and the host device (e.g., a cellular telephone, a smart phone, a media player, or a tablet computer, and similar devices) to establish radio communication with each other by bringing them into close proximity. For example, a form of near field communication using an ISO/IEC 18000-3 air interface has a practical operating distance of approximately four centimeters, using a frequency of 13.56 MHz, and is capable of communication at data rates ranging from 106 kbit/s to 424 kbit/s. A representative embodiment of the present invention may use NFC peer-to-peer communication, in which both ends of the communication link may be self-powered. Additional information about near field communication may be found at http://www.nfc-forum.org/specs/.

Yet another representative embodiment of the present invention may communicate with a host device using an existing electrical and physical interface of the host device. Portable electronic devices such as cellular telephones, smart phones (e.g., those from Apple (i.e., iPhone®), Samsung (e.g., Galaxy), HTC, LG, and other manufacturers), media players (e.g., the Apple iPod® and Apple iTouch®, Microsoft Zune®, and others), and tablet computers/e-readers (e.g., Apple iPad®, Amazon Fire®, Nook, and others) have physical connectors that carry a variety of digital and analog signals, which may include IEEE 1394 (a.k.a., FireWire) and Universal Serial Bus (USB) compatible digital data communication interfaces.

A representative embodiment of the present invention may physically attach to a host device using springs, clips, screws, latches, adhesives, magnetic, and/or any other suitable form of physical attachment, or such an embodiment may be held in sufficiently close physical proximity to the host device within a common enclosure or containment (or may comprise the common enclosure or containment) that physically maintains an operating relationship with the host device.

In some representative embodiments, the enclosure or containment of the accessory device may be a flexible material that provides cushioning against damage to the host device due to rough handling, and such a material may be suitably elastic to allow tension within the material to hold the host device and the accessory device in an arrangement suitable to maintain operation and use of the host device as augmented by the capabilities of the accessory device. Protective benefits for the host device, however, are not necessarily provided by a representative embodiment of the present invention, as other materials and arrangements that do not protect the host device may provide the desired operable physical arrangement of the accessory device with the host device, without departing from the spirit and scope of the present invention.

The electrical circuitry of a representative embodiment of the present invention may include one or more processors to process signals from a micro-electromechanical system (MEMS) flow sensor suitable for detecting flow of human breath, and communication circuitry for wired or wireless communication with a host device. The one or more processors may be operably coupled to one or more storage devices within the add-on device. Such storage devices may be used as memory to store executable code and/or data for operating the add-on device, and for communication with the host device. The memory may be, for example, any suitable memory technology including, but not limited to, flash memory or battery backed random access read-write memory. The one or more processors may interpret the signals from the MEMS sensor into a form that is understood by the circuitry of the host device, to permit the user of the add-on device of the present invention to control the host device by directing the flow of their breath at, upon, or across the MEMS sensor of the accessory device. The operative coupling of a representative embodiment of the present invention to a host device may result in the user interface of the host device being modified such that one or more user commands are communicated using the flow of breath at, upon, or across a breath sensitive digital interface in place of one user input, or augmenting user inputs normally received by the host device via a touch sensitive display or other tactual input technology of the host device.

A representative embodiment of the present invention may be, for example, a case, enclosure, or accessory in various form factors as suitable for attachment to a host electronic device such as, for example, a handheld, portable, or desktop electronic device, and which employs one or more devices for sensing the flow of a fluid, such as human breath directed by user at, upon, or across the sensor(s), to enable user control of the host electronic device using the flow of breath upon the sensor(s). A representative embodiment of the present invention and the host device may communicate one or both of information and power using radio frequency signals, near field communication signals, or any other suitable wireless communication technology, or over a suitable wired link.

A representative embodiment of the present invention may be used with a wide variety of applications, whether productivity or entertainment oriented, that are supported by the host device, and may be particularly well suited for use with application programs involving Augmented Reality (AR). Augmented Reality involves the blending of computer-generated graphics with real-life scenes or live video for viewing on the display screen of a user device such as, for example, a cellular telephone, a smart phone, a media player, a tablet, a netbook, a notebook, or a desktop computer, an e-reader, or other suitable device. For example, an Augmented Reality application may cause three-dimensional (3D) objects to appear when a user aims a camera of a handheld or mobile electronic device at a specific logo, a "quick response (QR)" code, a drawing, or any other image found, for example, in magazines, in children's play sets, or the like. Such an AR feature may be based on visual tracking (e.g., real-time image recognition of a given object, which may be "markerless"), or may be location-based (e.g., using a geographic position as determined by global positioning system (GPS) tracking technology). Such AR features may involve over-the-network synchronization with a database, or they may be entirely based on local capabilities and information. A representative embodiment of the present invention provides particular value in augmented reality applications, in which "virtual," even 3D information, is overlayed on the display screen of a handheld electronic device such as a handset, a tablet computer, or other flexible screen devices.

Devices with small display screens, such as cellular telephone, smart phones, media players, and tablet computers, netbooks, or notebook computers typically have display real estate problems, especially when the fingers of a user occlude or obstruct the user's view of displayed content. Wearable devices or special contact lenses and glasses may provide a user with a less restricted view of the world around them, however, these items may not be well-suited to many social situations, may not work well for multiplayer games or collaborative activities, and do not work well with young children.

In the case of 3D Augmented Reality games, puff-generated interaction, such as that enabled by a representative embodiment of the present invention, holds unrivalled benefits. This is because human breath is transparent and does not block or occlude viewing of screen content by the user. Further, puffing "at" or "across" a breath flow sensor in proximity to the display makes the display screen itself seem transparent, or "dematerialized", because the user feels as if he/she is puffing directly at the virtual content. This quality enables user interaction with the elements of the Augmented Reality in a "hyper-realistic" way. For example, a child who puffs at "Augmented" leaves, ladybirds, sand, and the like through the display of a phone "forgets" about the phone, and becomes fully immersed in the Augmented Reality, whereas conventional touch interaction with the display screen reduces the "credibility" of the so-created Augmented Reality, or at least creates a strong barrier to immersion. By enabling non-touch, non-occluding interaction with AR applications, and other forms of applications as well, a representative embodiment enables and reinforces the desired illusions.

In addition, a representative embodiment of the present invention permits single-handed operation of many features and applications of handheld and mobile electronic devices. This helps to significantly reduce or eliminate the effects of "fat finger," in which a user experiences unwanted selection of objects and features of an electronic device when "tapping" on a touch-sensitive display screen.

A representative embodiment of the present invention also provides additional user benefits. It is well documented and long proven in various disciplines (e.g., in "yoga," "chi gong," and "mana") that controlled breathing brings relaxation, improves concentration, and lowers blood pressure, to name only a few benefits. The brain consumes a substantial proportion of the oxygen we inhale. Controlled breathing has been demonstrated to help children learn, and to help adults stay focused and reduce fatigue. A representative embodiment of the present invention may be used to combine entertainment and well being, for example, through games where exhaling and inhaling are timed and sequenced so as to help the user to relax, and to realize the benefits described above. A representative embodiment of the present invention may be combined with biofeedback sensors to gain additional benefits.

FIG. 1 illustrates a smart phone device 110 and two prior art protective rubber bumpers 120, 130 for attachment to the smart phone device 110. As can be seen in FIG. 1, the rubber bumpers 120, 130 have a number of cut-outs or moldings to allow user access to controls and connectors on the edges of the smart phone device 110, and may be applied to the smart phone device by simply stretching the material sufficiently to allow the rubber bumpers to snap over the edges of the smart phone device 110. While the rubber bumpers 120, 130 provide some impact protection against shock along the edges of the smart phone device 110, and may help to hold the smart phone device 110 from sliding off of surfaces, the rubber bumpers 120, 130 do not otherwise modify the smart phone device 110, and do not change the operation, functionality, or ease-of-use of the user interface of the smart phone device 110.

Figure 2:
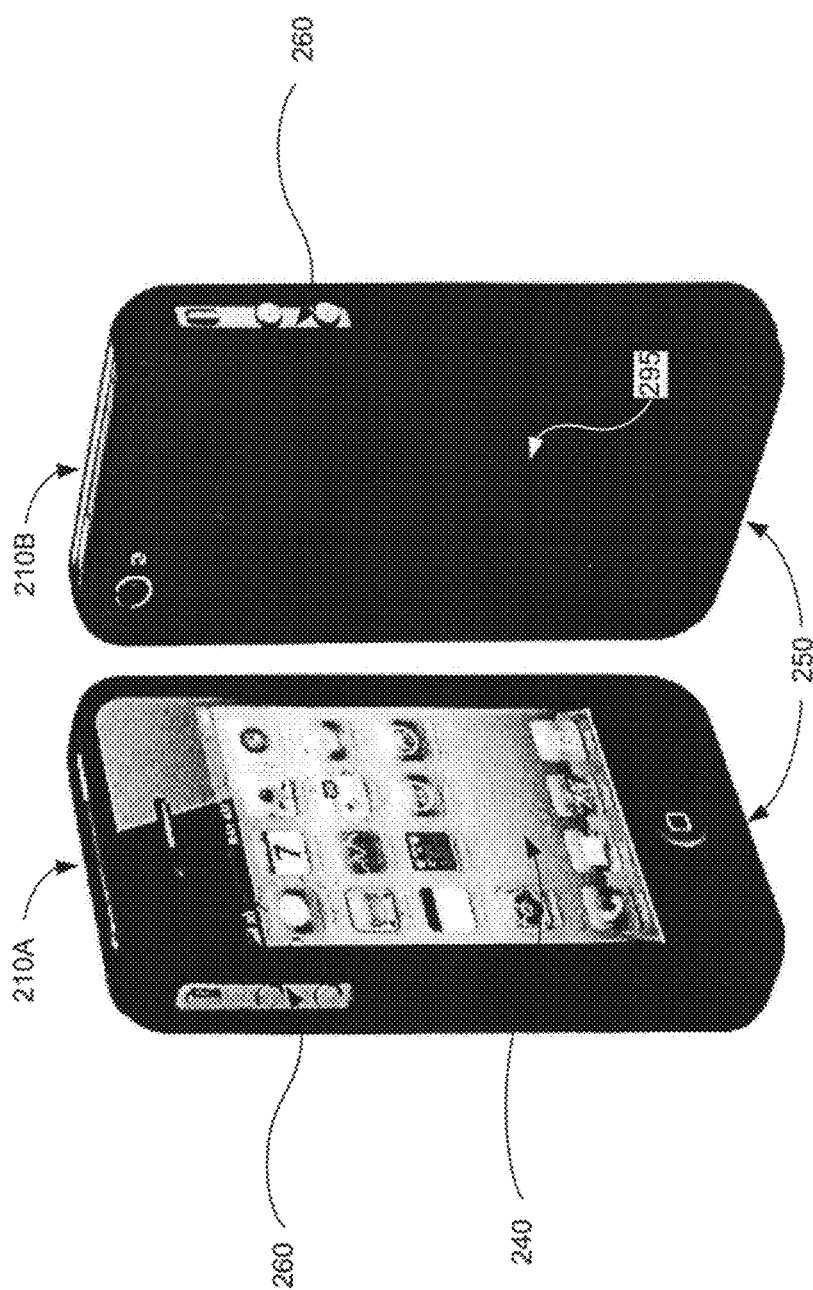
FIG. 2 illustrates a front view and a rear view of a handheld electronic device that may comprise, for example, the smart phone device of FIG. 1 when installed within an accessory device having a closed back, in accordance with a representative embodiment of the present invention.

FIG. 2 illustrates a front view 210A and a rear view 210B of a handheld electronic device that may comprise, for example, the smart phone device 110 of FIG. 1 when installed within an accessory device 250 having a closed back 295, in accordance with a representative embodiment of the present invention. In the illustration of FIG. 2, the accessory device is arranged to hold circuitry to permit the coupling of one or both of data and power between the accessory device 250 and the handheld electronic device. As is illustrated in FIG. 2, the accessory device 250 provides suitable cut-outs or moldings to permit access to the display screen 240 and controls 260 for operation of the handheld electronic device, similar to the rubber bumpers 120, 130 of FIG. 1, but also includes a cover over the back surface of the enclosed smart phone device in which may be located circuitry for communicative coupling of one or both of data and power using, for example, radio frequency, electromagnetic inductive, or near field communication technology. Further, the accessory device 250 may also contain a MEMS device for sensing the flow of a fluid such as human breath, and processing circuitry suitable for communication with the smart phone device enclosed by the accessory device, to allow user operation of the smart phone device using an enhanced user interface.

Figure 3:
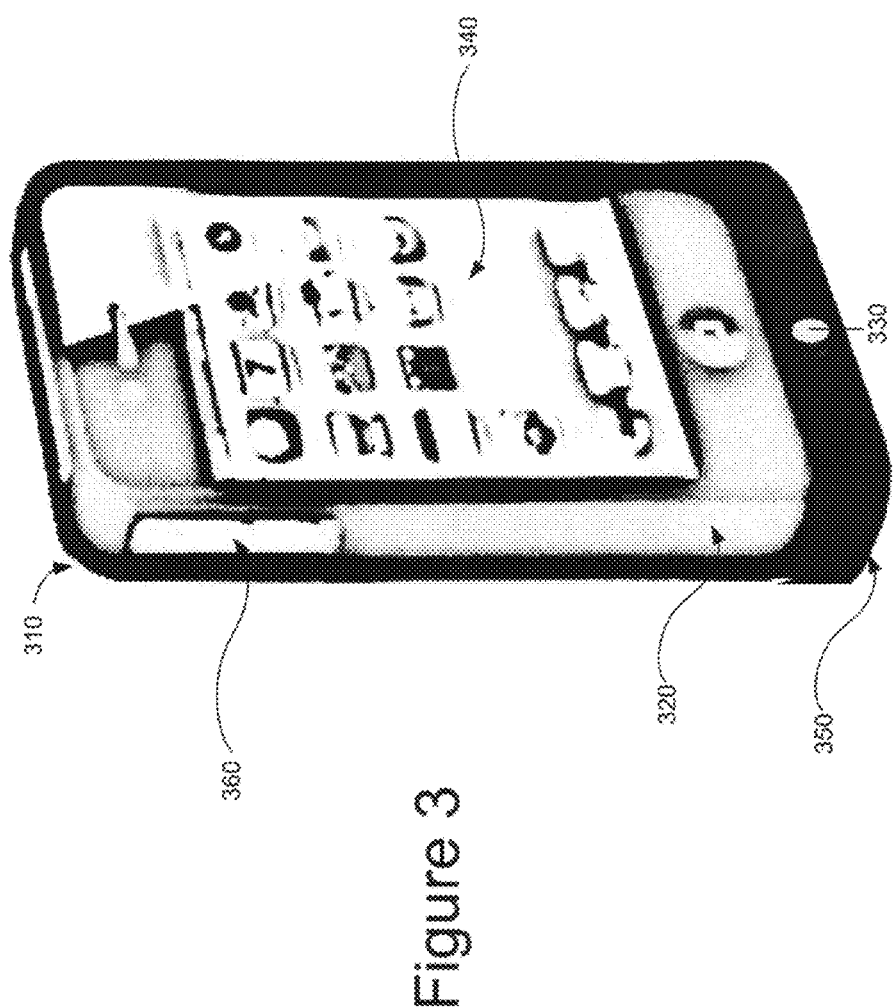
FIG. 3 illustrates a cut-away view of an exemplary accessory device enclosing a handheld electronic device that may correspond to, for example, the smart phone device of FIG. 1, in which the accessory device is arranged with a MEMS device for sensing the flow of a fluid such as human breath, and a circuitry portion containing circuitry for processing, power management, and communication of information that enables control of the handheld electronic device, in accordance with a representative embodiment of the present invention.

FIG. 3 illustrates a cut-away view of an exemplary accessory device 310 enclosing a handheld electronic device 320 that may correspond to, for example, the smart phone device 110 of FIG. 1, in which the accessory device 310 is arranged with a MEMS device 330 for sensing the flow of a fluid such as human breath, and a circuitry portion 350 containing circuitry for processing, power management, and communication of information that enables control of the handheld electronic device 320, in accordance with a representative embodiment of the present invention. It should be noted that although the illustration of FIG. 3 shows the circuitry portion 350 as being at a particular location within the accessory device 310, this does not necessarily represent a specific limitation of the present invention, unless recited by the claims, as the circuitry of a representative embodiment of the present invention may be distributed in a manner suitable to operation with the handheld electronic device, and the desired arrangement of the elements about the handheld electronic device.

As shown in FIG. 3, the accessory device 310 exposes the display screen 340 and controls 360 of the handheld electronic device 320 for viewing by the user, and for tactual input. The display screen 340 may be of a touch sensitive design that is normally employed when the handheld electronic device 320 is not coupled to the accessory device 310.

The processing and communication circuitry located in the circuitry portion 350 of the accessory device 310 may include the MEMS breath sensitive digital interface 330, one or more processors for analyzing the signals from the MEMS breath sensitive digital interface 330, communication circuitry for communicating control signals and responses between the accessory device 310 and the handheld electronic device 320, power management and regulation circuitry, and may include a primary or rechargeable battery to power the accessory device 310 (not shown). Further details of aspects of the circuitry of a representative embodiment of an accessory device are described below with respect to FIG. 6.

Some representative embodiments of the present invention that employ direct electrical connection to the handheld electronic device 320 may include one or more physical connectors for conducting power and control signals between the accessory device 310 and the handheld electronic device 320. Other representative embodiments of the present invention may employ radio frequency, electromagnetic induction coupling, near field communication, or other suitable communication technologies for communication of one or both of control signals such as command and responses, and power, between the accessory device 310 and the handheld electronic device 320 of FIG. 3.

In a representative embodiment of the present invention, the flow of the user's breath at, upon, or across the MEMS breath sensitive digital interface 330 of the accessory device 310 may be, for example, used in place of, or to augment, the actuation of controls such as the button controls 360 or, for example, the tapping, flicking, pinching, or spreading of fingers upon the touch sensitive display screen 340. Through the use of the directed flow of a user's breath at, upon, or across the MEMS breath sensitive digital interface 330, the user is enabled to single-handedly operate features of the handheld electronic device 320 that would otherwise require the use of two hands.

For example, a user of one representative embodiment of the present invention may, for example, direct their breath across a MEMS breath sensitive digital interface 330 in a left-to-right, right-to-left, top-to-bottom, and bottom-to-top movement to cause, the movement of an object, the panning of displayed content, or the scrolling of text, in a corresponding direction. The processing circuitry 350 in a representative embodiment of the present invention performs analysis upon the signals from the MEMS breath sensitive digital interface 330 and communicates commands to the handheld electronic device 320, enabling single-handed operation of the handheld electronic device 320. Such commands and any responses may be communicated between the accessory device 310 and the handheld electronic device using any of the wired or wireless communication technologies discussed herein, and may control operation of aspects of the handheld electronic device 320 normally controlled by integrated input devices involving use of the fingers, such as for example, a touch sensitive display.

Figure 4:
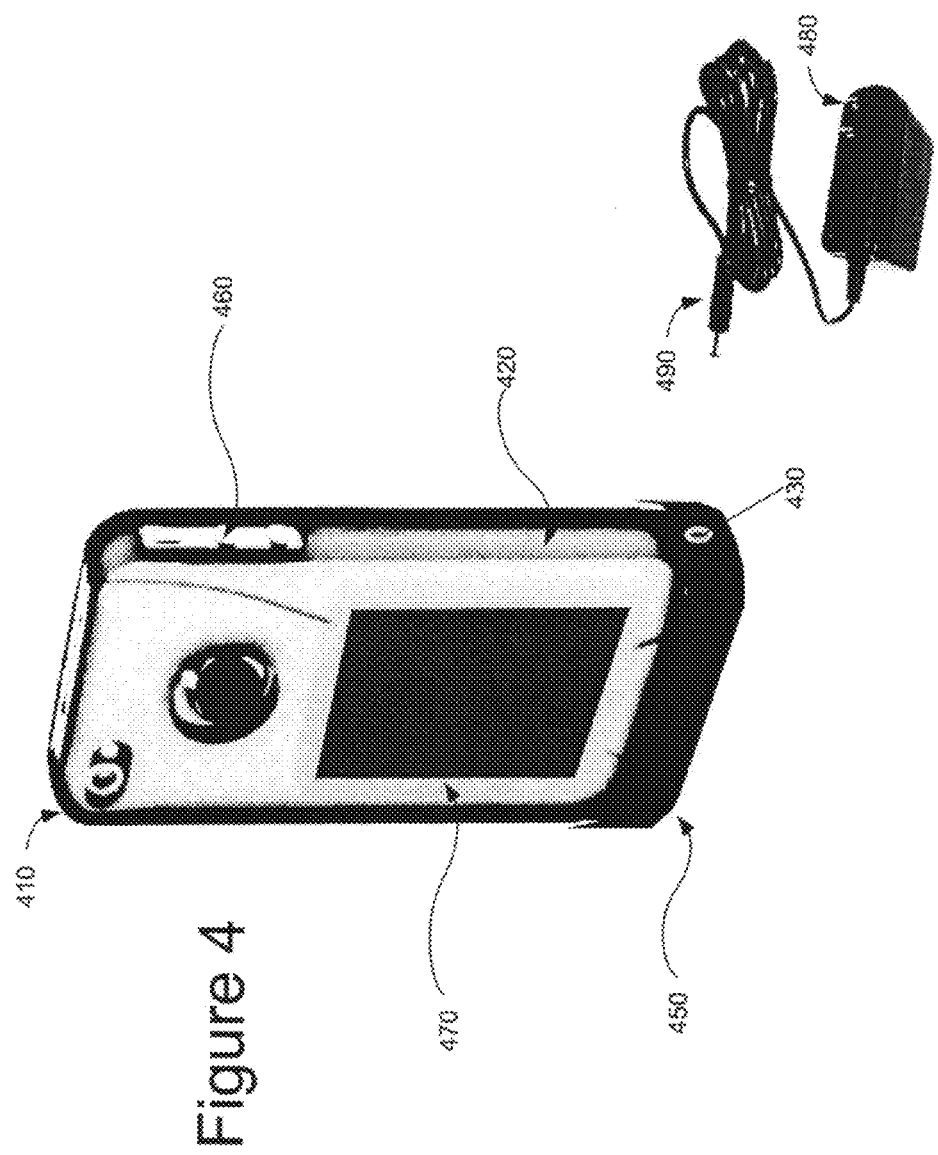
FIG. 4 is an illustrated cut-away view of an exemplary embodiment of an accessory device that may correspond to, for example, the accessory device of FIG. 3, in accordance with a representative embodiment of the present invention.

FIG. 4 is an illustrated cut-away view of an exemplary embodiment of an accessory device 410 that may correspond to, for example, the accessory device 310 of FIG. 3, in accordance with a representative embodiment of the present invention. The illustration of FIG. 4 shows the back of a handheld electronic device 420, which may be, for example, a cellular telephone, a smart phone, a media player, a tablet, a netbook or notebook computer, or the like, enclosed within the accessory device 410. The accessory device includes a circuitry portion 450 that may house circuitry for processing signals from a MEMS breath sensitive digital interface such as the MEMS breath sensitive digital interface 330 of FIG. 3, and for communication of commands and responses between the accessory device 410 and the handheld electronic device 420. The accessory device 410 includes a connector 455 through which power for one or both of operation of the accessory device and charging of an internal rechargeable battery may be supplied via a mating connector 490 of the power supply 480.

The accessory device 410 of FIG. 4 may also include a coupling circuit 470 that is electrical connected to the processing and communication circuitry of the circuitry portion 450. The coupling circuit 470 may communicate one or both of power and digital information between the accessory device 410 and the handheld electronic device 420 using, for example, radio frequency, electromagnetic induction, near field communication, or any other suitable technology. The digital information communicated between the accessory device 410 and the handheld electronic device 420 may include one or both of commands and responses related to the actions of the user relative to a MEMS breath sensitive digital interface of the accessory device 410.

Figure 5:
FIG. 5 is an illustration of an exemplary embodiment of a ruggedized accessory device that may be used to permit control of a handheld electronic device that may include, for example, a cellular telephone, a smart phone, a media player, a tablet computer, a netbook computer, a notebook computer, or a child's handheld electronic toy, in accordance with a representative embodiment of the present invention.

FIG. 5 is an illustration of an exemplary embodiment of a ruggedized accessory device 510 that may be used to permit control of a handheld electronic device 520 that may include, for example, a cellular telephone, a smart phone, a media player, a tablet computer, a netbook computer, a notebook computer, or a child's handheld electronic toy, in accordance with a representative embodiment of the present invention. The handheld electronic device 520 of FIG. 5 is equipped with a display screen 540, and the accessory device 510 includes a MEMS breath sensitive digital interface 530 that may be arranged in a manner so as to be usable when viewing the display screen 540. The accessory device 510 may be designed with processing, communication, and power management circuitry such as that described above with respect to FIG. 4 and below with respect to FIG. 6.

Figure 6:
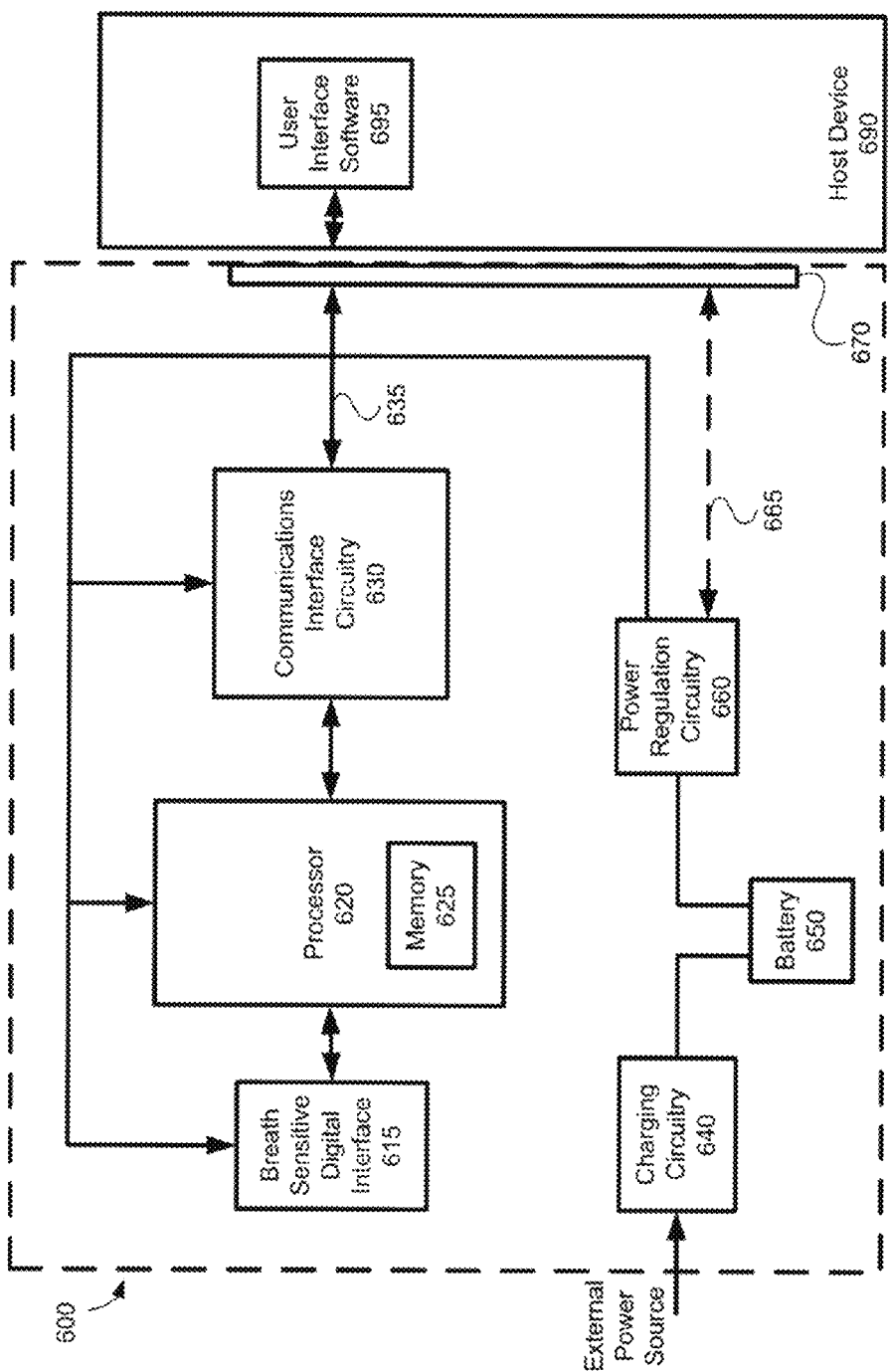
FIG. 6 is a block diagram illustrating an exemplary system that may correspond to elements of the circuitry portions employed in the accessory devices of FIGS. 3, 4, and 5, in accordance with a representative embodiment of the present invention.

FIG. 6 is a block diagram illustrating an exemplary system 600 that may correspond to elements of the circuitry portions 350, 450, 550 employed in the accessory devices 310, 410, 510 of FIGS. 3, 4, and 5, in accordance with a representative embodiment of the present invention. The system 600 of FIG. 6 includes a MEMS breath-sensitive digital interface device 610 coupled to a processor 620. The processor 620 communicates with a host device 690 via communication circuitry 630, a link 635, and a coupling means 670. The processor 620 has read/write access to one or more storage devices, which are represented in FIG. 6 as memory 625. The memory 625 may be arranged to store executable program code, program variable and constants, and other data for use by the processor 620. Although illustrated as a single element, the processor 620 may be multiple processors distributed within other elements of the system 600. As also shown in FIG. 6, the system 600 includes a battery 650, charging circuitry 640, and power regulation circuitry 660 that may provide power for the system 600, and receive power from or provide power to the host device 690 via path 665.

The breath-sensitive digital interface 610 of FIG. 6 includes a micro-electromechanical system (MEMS) sensor, which may be, for example, a MEMS sensor such as those described in U.S. Provisional Patent Application No. 61/431,716, entitled "MEMS/MOEMS Sensor Design," filed Jan. 11, 2011, and U.S. patent application Ser. No. 12/055,999, entitled "Method And System For A MEMS Detector That Enables Control Of A Device Using Human Breath," filed Mar. 26, 2008, and U.S. patent application Ser. No. 13/348,537, entitled "MEMS/MOEMS Sensor Design," filed Jan. 11, 2012, the complete subject matter of each of which is hereby incorporated by reference, in its respective entirety. In some representative embodiment of the present invention, the breath-sensitive digital interface 615 may also include functionality, in software and/or hardware, to perform analog calibration, low-pass filtering, and other functions in analyzing the flow of breath at, upon, or across the MEMS sensor of the breath sensitive digital interface 615. In other embodiments, one or more of such analog calibration, low-pass filtering, and any other functions involved in analyzing the flow of breath at, upon, or across the MEMS sensor of the breath sensitive digital interface 615 may be performed by the processor 620, for example.

In the illustration of FIG. 6, the host device 690 communicates with the system 600 using a communication link that includes coupling device 670 and link 635, and may be, for example, a wired or wireless communication link including but not limited to a near field communication technology, a radio frequency communication technology such as BLUETOOTH®, or a proprietary or industry standard wired communication technology such as, for example, a synchronous or asynchronous serial communication link operating according to an asynchronous protocol, a Universal Serial Bus (USB) link, an IEEE 1394 (aka, "Fire-Wire") link, or other suitable serial data communication technology. In representative embodiments in which the communication between the accessory device and the host device 690 uses a wired interface, the coupling device 670 may be a physical connector to conduct electrical signals. In other representative embodiments employing a wireless communication technology to link the system 600 and the host device 690, the coupling device may be, for example, a radio frequency antenna, a coil or an inductor, or a device for coupling a near field signal. It should be noted that the mentioned data communication technologies do not necessarily represent specific limitations of the present invention, unless recited by the claims, in that other means of communication may be also used. For example, the communication interface circuitry 630 of the system 600 may also include suitable circuitry and/or software to support the Universal Serial Bus (USB) protocol, a suitable circuitry and/or software to support the IEEE 1394 protocol, or suitable circuitry and/or software to support the Bluetooth® protocol to provide wireless connectivity, to permit communication with other devices such as, for example, a personal computer, a smart phone, a cellular telephone, a media player, or other suitable device.

The battery 650 of the system 600 may be used to provide power for the system 600 when power is not available from other sources such as, for example, the host device 690, and may, for example, store energy using a lithium polymer or other suitable chemistry. Regulation of the supply voltage for the breath-sensitive digital interface 615, the processor 620, and the communication circuitry 630, for example, from the level provided by the battery 650 or another source (e.g., host device 690) is provided by the power regulation circuitry 660. The battery 650 may be charged from an external commercial power source or from the power available from an interconnected cellular telephone, smart phone, media player, tablet computer, or other suitable electronic device. It should be noted that the elements shown in FIG. 6 are presented for reasons of illustration and example, and should not be interpreted as representing limitations of the present invention, unless recited by the claims, in that a breath-sensitive digital interface may be arranged within circuits in which functions described above are assembled in different combinations and re-arrangements.

In a representative embodiment of the present invention, the form factor of the accessory device may be an adaptable, extensible case, or "bumper case", to further protect a handheld electronic device such as, for example, a phone, a tablet computer, or other portable electronic device from damage resulting from drops, shocks, and the like. The adaptability of such a representative embodiment may permit a single accessory device to adapt to many handheld electronic devices, e.g., all smart phones.

A representative embodiment of the present invention may, for example, use springs, elastic bands, and/or magnets, or any other suitable fastener or attachment, to ensure a proper fit with the handheld electronic device. An informal review of smart phones on the market at the time of filing of the present application shows that the variation in length of a handheld electronic device such as, for example, a smart phone, is within a range of about 2 centimeters, that the variation in width of such a device is within a range of about one centimeter, and that the thickness varies within a range of about 0.5 cm. A representative embodiment of the present invention may have embedded springs to ensure proper fit. A variety of materials may be used such as, for example, metallic springs, non-metallic springs (e.g. beryllium copper), non-magnetic materials (metallic or not), and possibly springs made of plastics may provide the required basic tension/compression mechanisms.

In one representative embodiment of the present invention, flat springs and spring clips, metal pressings, or possibly wire forms may be utilized.

The material of the bumper case may be of higher density around the springs to keep them in place and ensure proper functioning, whereas springs may be positioned as one single part for polymer/elastomer molding. Metal to rubber bonded parts manufacturing processes may also be used for sandwich packing such spring system.

In a preferred form factor, a representative embodiment of the present invention is designed to be used in landscape mode, to maximize user experience in use cases involving handheld electronic devices such as games and in Augmented Reality entertainment with handsets. A representative embodiment of the present invention, as described herein, may easily fit all such models.

A representative embodiment of the present invention may allow for more elasticity/"shrinkability" in the length dimension than in the width dimension, and may permit even more adjustment for the thickness of the handheld electronic device, which varies very little. The form factor of a representative embodiment of the present invention may be designed to fit even on top of existing, thin cases.

A representative embodiment of the present invention, which may act as a "one size fits all" accessory device, reduces the costs related to inventory management, enables users to share the accessory device across handheld electronic devices, and differentiates the product itself. A protective sheet may be positioned inside a compartment that houses the handheld electronic device. Such a sheet may be made of materials, for example, silicon rubber, and may be bonded to the main case frame by known methods such as heating/melting to provide good shear resistance, waterproof assembly and preserve elasticity.

A representative embodiment of the present invention may be fabricated in a particular form factor (i.e., landscape or portrait) using a wide diversity of elastic materials that may include, for example, injection moldable materials, and which may encompass such materials as neoprene rubber. The desired shrinkability/expandability of the material for a particular form factor may be obtained by varying the density, thickness, and other parameters. The accessory device may be made of viscoelastic materials (e.g., having low Young's Modulus). The materials used may be able to withstand reversible extension and have high yield strain. The attached drawings depict the areas of greater elasticity with "accordion-like" lines. These may be areas of reduced density, for example, and lesser thickness. The outside corners may, by contrast, have greater density to enhance shock protection, for example, in case of usage by children. The inside compartment in which the handheld electronic device (e.g., a mobile handset) is placed may have large radius corners for the handheld electronic device to sit more firmly.

The thickness dimension of an accessory device of the present invention may include holes for access to switches and buttons, while making it uneasy to unintentionally hit these controls, for usage cases such as games and other children's activities FIG. 7 illustrates a front view of an exemplary accessory device 700 in which the material and design used result in areas of higher-density or thickness 710 for increased protection and areas of lesser density or thickness 720 for maximum elasticity, in accordance with a representative embodiment of the present invention.

FIGS. 8A and 8B illustrate an exemplary portrait mode accessory device arrangement 800 and an exemplary landscape mode accessory device arrangement 850, respectively, in accordance with a representative embodiment of present invention. FIG. 8A shows the use of a flex-rigid 820 linking a near-field communication device 810 with a PCB 830 to couple to a handheld electronic device used in a portrait orientation such as, for example, a mobile handset. FIG. 8B illustrates use of an accessory device 850 having, for example, a rigid PCB 880 in a lower portion of the accessory device 850 applied to a handheld electronic device used in landscape mode such as, for example, a smart phone or electronic game device.

FIG. 9A illustrates the possible variation in thickness of handheld electronic device that can be accommodated by an elastic or expansion region 920 of an accessory device 900, in accordance with a representative embodiment of the present invention. As illustrated in FIG. 9A and discussed above, a variation in thickness of the handheld electronic device of as much as about 0.5 cm. or more may be accommodated by an accessory device in accordance with a representative embodiment of the present invention, such as the accessory device 900.

FIG. 9B illustrates possible variation in length and width of handheld electronic device that can be accommodated by an elastic or expansion region 970 of an accessory device 950, in accordance with a representative embodiment of the present invention. As illustrated in FIG. 9B and discussed above, a variation in width of the handheld electronic device 850 of as much as about 1 cm. or more, and a variation in length of the handheld electronic device 850 of as much as about 2 cm. or more may be accommodated by an accessory device in accordance with a representative embodiment of the present invention, such as the accessory device 950.

FIG. 10A illustrates a front view and a side view of an exemplary stand 1000A that may attach to a handheld electronic device using, for example, a form of magnetic attachment, in accordance with a representative embodiment of the present invention. This representative embodiment of the present invention in landscape form factor may use magnets, to ensure firm wrapping of the bumper case around the device FIG. 10B illustrates a front view of an exemplary stand 1000B having handles 1010B that may serve as a stand for tabletop use, in accordance with another representative embodiment of the present invention. This representative embodiment of the present invention in landscape form factor may use magnets, as depicted in FIG. 10A, to ensure firm wrapping of the bumper case around the device, and may include handles for easier positioning and control, particular in usage scenarios such as, for example, with Augmented Reality games. The handles 1010B may also be fixed via other means as well such as Velcro©, or other such quick and easy attachment means.

FIGS. 11A, 11B, and 11C illustrate a cross section view of a portion of an exemplary accessory device 1100, showing an arrangement for insertion of a printed circuit board (PCB) 1160 into the accessory device 1100, and the positioning of a handheld electronic device in close proximity, in accordance with a representative embodiment of the present invention. The PCB 1160 may comprise, for example, the circuitry of the accessory device 1100, including a microelectromechanical system for sensing flow of breath of a user, communication circuitry for communicating with the handheld electronic device such as, for example, that using a near-field or Bluetooth® communication standard, and any processing and power management circuitry. Such an accessory device 1100 may also comprise a power receptacle/plug 1180 for connection to a source of power external to the accessory device such as a wall or vehicle power adapter.

Figure 11D:
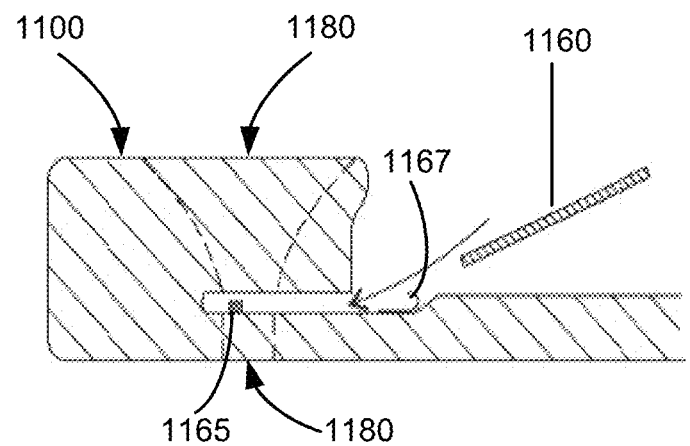
FIG. 11D illustrates positioning of the PCB prior to insertion of the PCB into the cavity of the accessory device, and shows locating pins to aid in positioning the PCB within the cavity in a desired relationship relative to one or more opening(s) or aperture(s) in the accessory device, and a hook-shaped bracket for retaining the PCB once positioned within the cavity, in accordance with a representative embodiment of the present invention.

FIGS. 11D, 11E, 11F, and 11G illustrate cross section views of portions of an exemplary accessory device 1100 similar to that shown in FIGS. 11A, 11B, 11C, in which a printed circuit board 1160 inserted into the accessory device 1100 is held and located within a cavity by, for example, one or more locating pins 1165 and a hook shaped bracket 1167, in accordance with a representative embodiment of the present invention.

FIG. 11D illustrates positioning of the PCB 1160 prior to insertion of the PCB 1160 into the cavity of the accessory device 1100, and shows locating pins 1165 to aid in positioning the PCB 1160 within the cavity in a desired relationship relative to one or more opening(s) or aperture(s) 1180 in the accessory device 1100, and a hook-shaped bracket 1167 for retaining the PCB 1160 once positioned within the cavity, in accordance with a representative embodiment of the present invention.

Figure 11E:
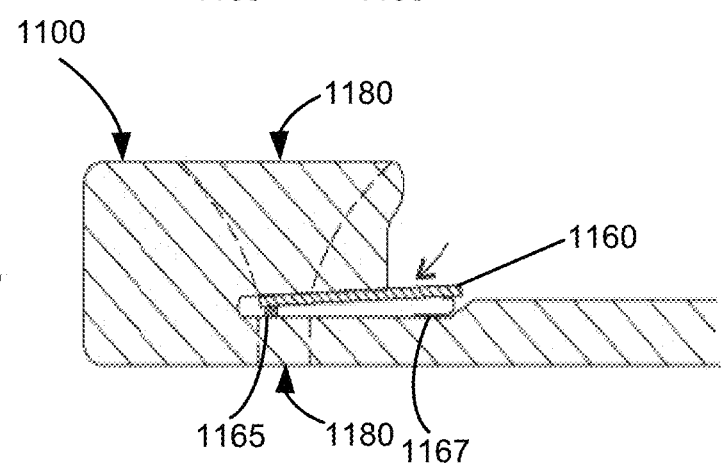
FIG. 11E illustrates the location of the PCB within the cavity just prior to the desired end, final, or resting position, before the PCB has been fully inserted, and before the locating pins have engaged mating holes in the PCB, in accordance with a representative embodiment of the present invention.

FIG. 11E illustrates the location of the PCB 1160 within the cavity just prior to the desired end, final, or resting position, before the PCB 1160 has been fully inserted, and before the locating pins 1165 have engaged mating holes in the PCB 1160, in accordance with a representative embodiment of the present invention.

Figure 11F:
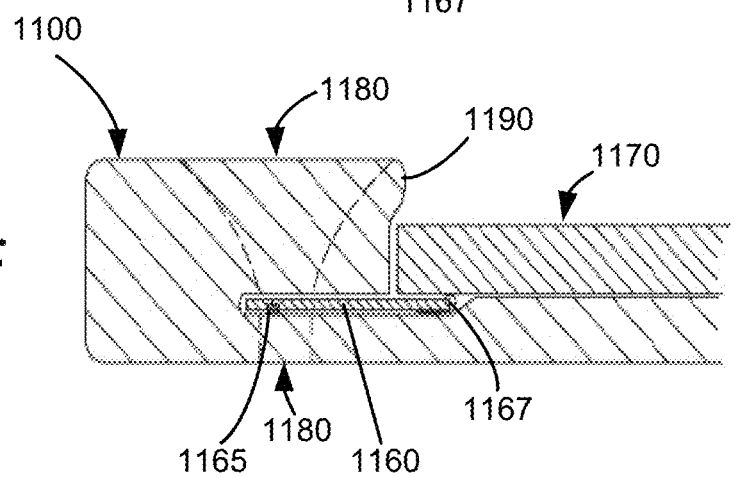
FIG. 11F illustrates the end, final, or resting position of the PCB when fully seated within the cavity of the accessory device, in accordance with a representative embodiment of the present invention.

FIG. 11F illustrates the end, final, or resting position of the PCB 1160 when fully seated within the cavity of the accessory device 1100, in accordance with a representative embodiment of the present invention. In FIG. 11F, the locating pins 1165 have aligned and mated with corresponding holes in the PCB, and the hook-shaped bracket 1167 is acting to retain the edge of the PCB 1160 against the floor of the cavity. In a representative embodiment of the present invention, the portion of the material (e.g., elastomere) located under or behind the PCB 1160 may be of the highest density. FIG. 11F also illustrates a handheld electronic device 1170 which is shown installed within the accessory device 1100 and in position for operation with the installed PCB 1160. In the end or final position shown in FIG. 11F, the PCB 1160 is situated such that one or more openings in a PCB-mounted micro-electromechanical system (MEMS) sensor for sensing the flow of breath of a user (not shown) are substantially aligned with one or more openings or apertures 1180 in the material of the accessory device 1100, to permit the flow of breath upon the surface of the accessory device 1100 to efficiently pass through to the MEMS sensor, to enable user control of the handheld electronic device 1170 using breath or "wafting." The PCB 1160 on which the MEMS sensor is located may also have one or more openings to permit fluid such as, for example, human breath to freely flow through the MEMS sensor and exhaust through the PCB 1160, to avoid the build up of pressure and/or condensation in the MEMS sensor. The accessory device 1100 as shown in FIGS. 11D, 11E, and 11F also includes a lip 1190 to aid in retaining the handheld electronic device 1170 within the accessory device 1100.

FIG. 11G illustrates a wireframe view of a portion of an exemplary accessory device 1100 that may, for example, correspond to the accessory device of FIG. 11F, showing a cavity with locating pins 1165 and a hook-shaped bracket 1167, and a PCB 1160 prior to insertion within the cavity, in accordance with a representative embodiment of the present invention.

FIG. 12 illustrates an exemplary embodiment of an accessory device 1200 that may correspond to, for example, the accessory devices 1100 of FIGS. 11A-11F, having a lip 1290 that is positioned above and wraps in front of the edge of a handheld electronic device 1270 such as, for example, a mobile handset, to restrain the handheld electronic device 1270 within the accessory device 1200, in accordance with a representative embodiment of the present invention.

Figure 13:
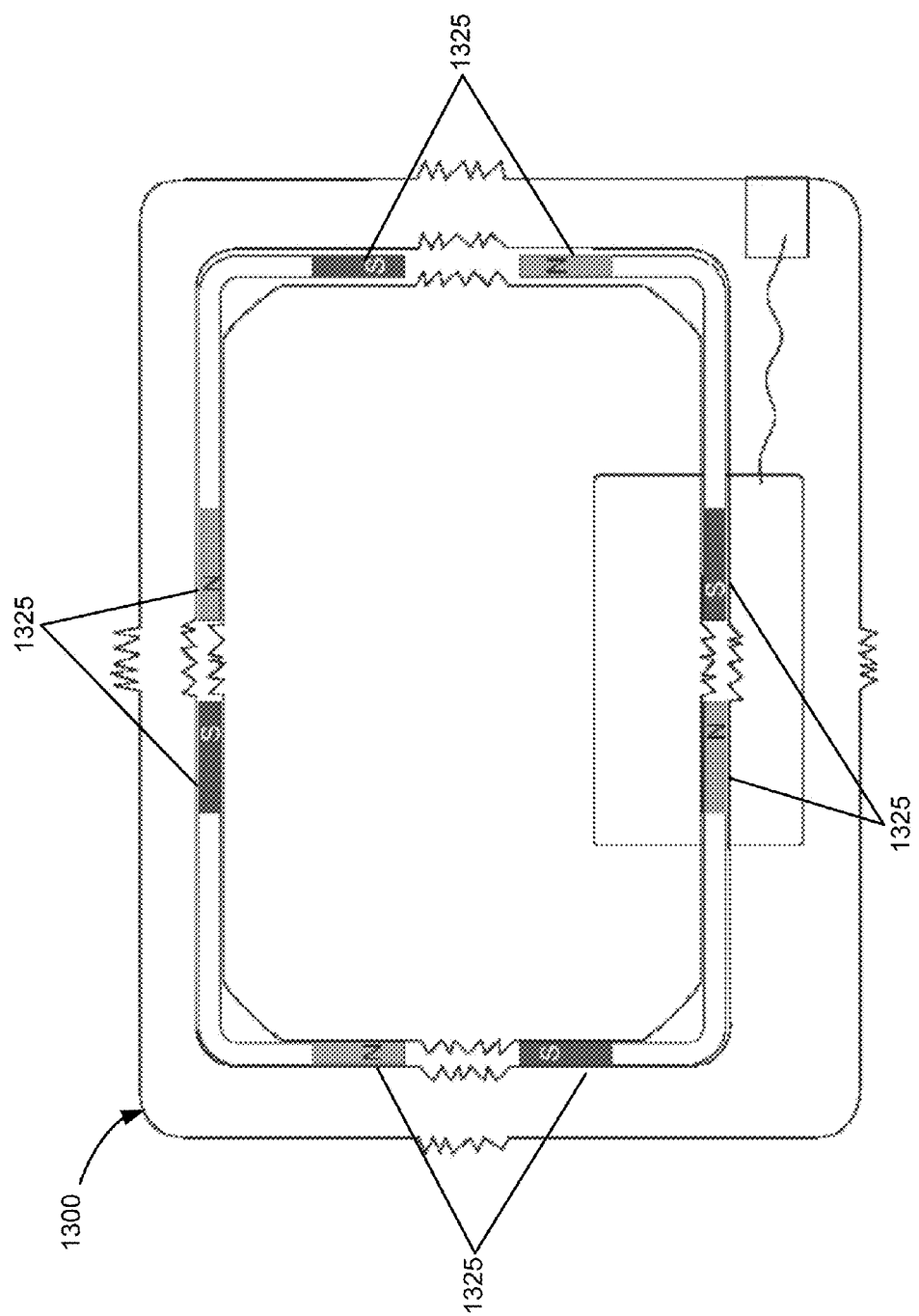
FIG. 13 is an illustration of an exemplary accessory device that employs magnets that attract both in the x and y planes so as to "wrap" the accessory device around a handheld electronic device such as, for example, a mobile handset or smart phone, in accordance with a representative embodiment of the present invention.

FIG. 13 is an illustration of an exemplary accessory device 1300 that employs magnets 1325 that attract both in the x and y planes so as to "wrap" the accessory device 1300 around a handheld electronic device such as, for example, a mobile handset or smart phone, in accordance with a representative embodiment of the present invention. In a representative embodiment of the present invention, the magnets 1325 may be positioned so as to not affect electromagnetic signals and radio frequency (RF) emission and reception (e.g., at the top and bottom of the phone's enclosure). In a representative embodiment of the present invention, the magnets 1325 may be used to ensure proper fit of the accessory device 1300 "around" a handheld electronic device (e.g. cellular telephone, smart phone or the like, not shown). The magnets 1325 may be shielded toward the handheld electronic device (e.g., they may be placed in metal foam at assembly) to prevent electromagnetic interference (EMI) or speaker issues. Such a representative embodiment may use conductive ceramic material (not shown) as an aid to further reduce electromagnetic radiation or electromagnetic compatibility and susceptibility.

Figure 14:
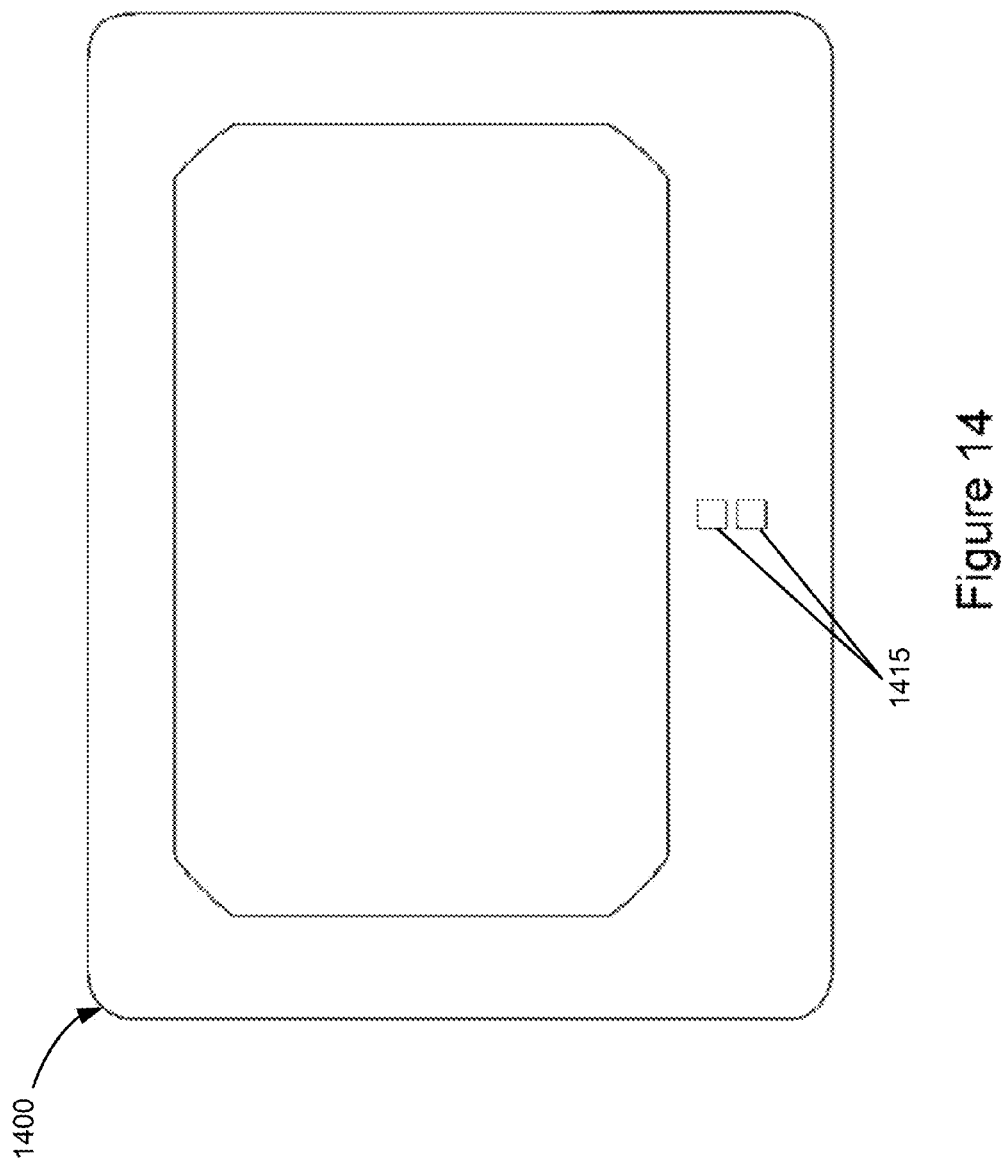
FIG. 14 illustrates an exemplary accessory device in which one or more sensors such as, for example, a microelectromechanical system (MEMS) for sensing the flow of human breath, a light sensor, a temperature sensor, an arrangement of one or more microphones, an ultrasonic sensor, or other type of sensing device may be positioned for use in landscape mode, in accordance with a representative embodiment of the present invention.

FIG. 14 illustrates an exemplary accessory device 1400 in which one or more sensors 1415 such as, for example, a micro-electromechanical system (MEMS) for sensing the flow of human breath, a light sensor, a temperature sensor, an arrangement of one or more microphones, an ultrasonic sensor, or other type of sensing device may be positioned for use in landscape mode, in accordance with a representative embodiment of the present invention. Although the sensors 1415 are shown as being positioned in a central position of the lower edge of the accessory device 1400, this does not necessarily represent a specific limitation of the present invention, unless recited by the claims, as sensors 1415 may be located within the accessory device 1400 at various locations around the front, edges, and even the back, without departing from the spirit and scope of the present invention.

The various sensing elements 1415 (e.g., breath flow (e.g., "waft-sensing" or breath sensitive MEMS), microphone(s), temperature sensor(s), and the like) as well as the power charging, power regulation, and communication (e.g., radio frequency wireless, near field, and the like) components may be arranged on one circuit board (e.g., the PCB 1160 of FIGS. 11A-11F) which may be rigid or flex-rigid, and the form factor used may have holes to enable the flow of air and breath to hit the sensing elements 1415, and to freely exhaust from the accessory device 1400, so as to prevent pressure buildup, accumulation of condensation, and other such environmental issues.

The sensing elements such as, for example, the sensing elements 1415 in a representative embodiment of the present invention may be positioned within a focused area so as to permit minimum airflow travel for the user, and to maximize the user experience.

Figure 15:
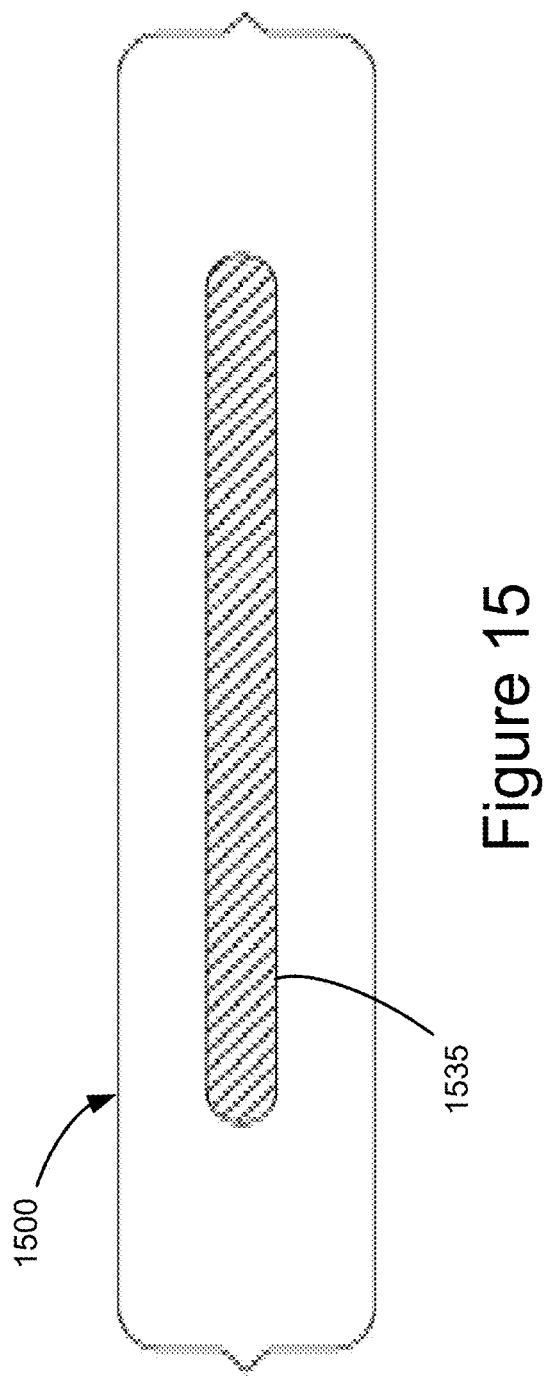
FIG. 15 illustrates the edge of an exemplary accessory device showing an elongated opening in the material to allow access to buttons, connectors, or other user accessible controls and features of a handheld electronic device held within the accessory device, in accordance with a representative embodiment of the present invention.

FIG. 15 illustrates the edge of an exemplary accessory device 1500 showing an elongated opening 1535 in the material to allow access to buttons, connectors, or other user accessible controls and features of a handheld electronic device held within the accessory device 1500, in accordance with a representative embodiment of the present invention.

Figure 16A:
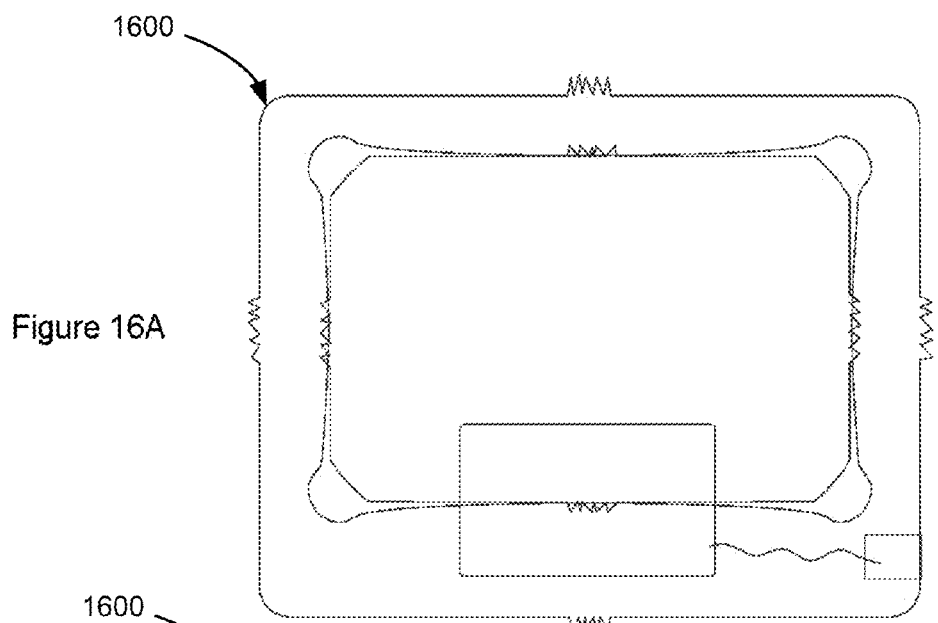
FIGS. 16A, 16B, 16C illustrate fontal and edges views of an exemplary accessory device using flat springs, in accordance with a representative embodiment of the present invention.
Figure 16B:
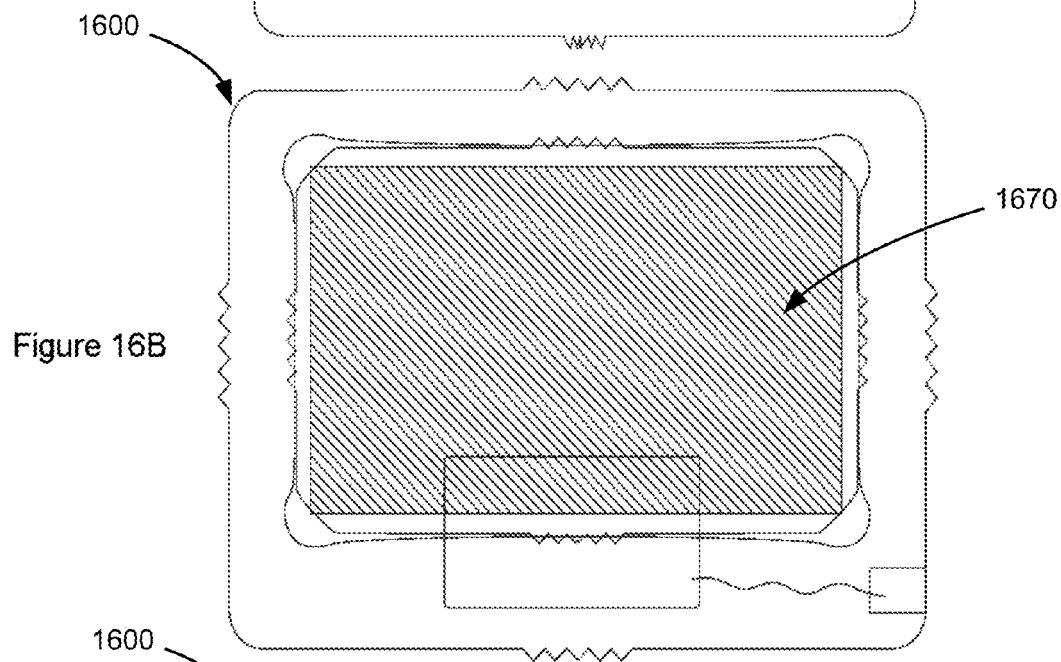
Figure 16C:
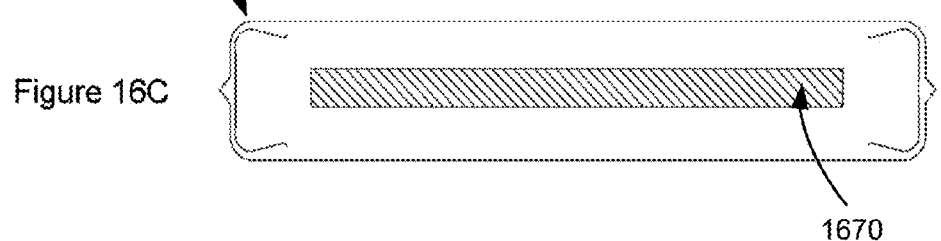

FIGS. 16A, 16B, 16C illustrate fontal and edges views of an exemplary accessory device 1600 using flat springs, in accordance with a representative embodiment of the present invention. FIG. 16A shows a frontal view of the accessory device 1600 at rest, while FIG. 16B shows a frontal view of the accessory device 1600 in an expanded state, in which the cross-hatched area 1670 represents an enclosed handheld electronic device. FIG. 16C shows a view of the accessory device 1600 from an edge, showing a corresponding edge of the handheld electronic device 1670.

Figure 16D:
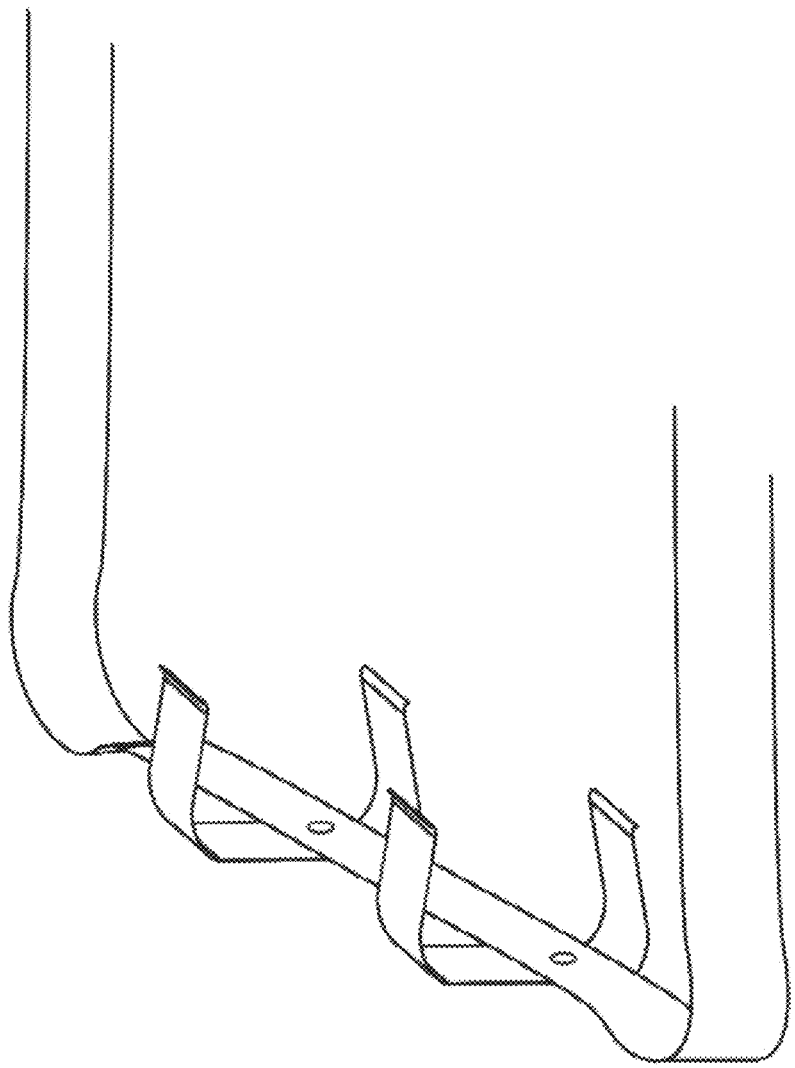
FIG. 16D illustrates an exemplary structure of elements such as, for example, suitable springs, magnets, or other forms of attachment or restraining means used to retain a handheld electronic device within an accessory device such as, for example, the accessory devices of FIGS. 2-16C, in accordance with a representative embodiment of the present invention.
Figure 18A:
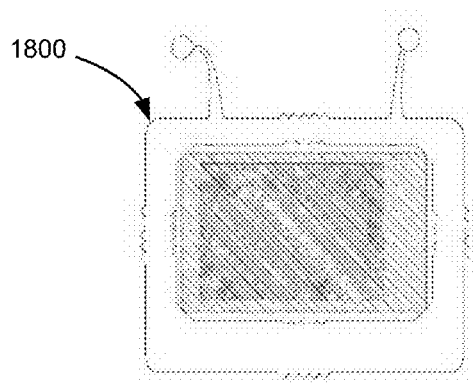
FIGS. 18A, 18B, 18C, 18D illustrate frontal views of four exemplary embodiments of accessory devices for use by children, in accordance with representative embodiments of the present invention.
Figure 18B:
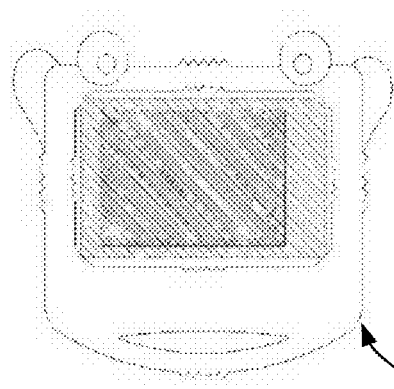
Figure 18C:
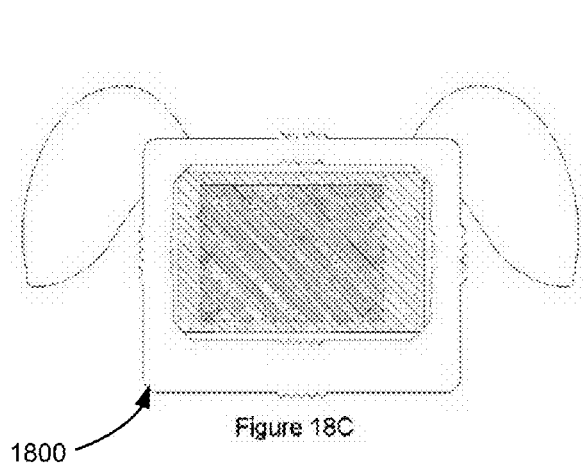
Figure 18D:
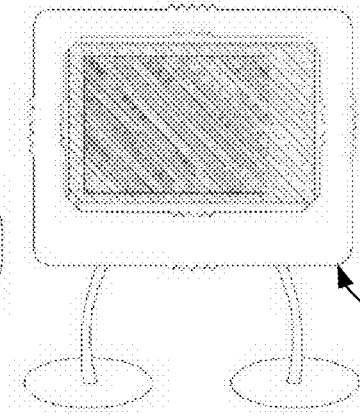

FIG. 16D illustrates an exemplary structure of elements 1675 such as, for example, suitable springs, magnets, or other forms of attachment or restraining means used to retain a handheld electronic device within an accessory device such as, for example, the accessory devices of FIGS. 2-16C, in accordance with a representative embodiment of the present invention. In a representative embodiment of the present invention, the entire structure for maintaining the relative positioning of the accessory device with respect to the handheld electronic device may comprise a single structure 1675 as shown in FIG. 16D. This may be desirable, for example, in order to simplify the manufacture and ease assembly of the accessory device 1600.

FIGS. 17A, 17B illustrate differences in elasticity and density of the material used in fabricating one exemplary accessory device 1700 using a polymer/elastomer, in accordance with a representative embodiment of the present invention.

FIGS. 18A, 18B, 18C, 18D illustrate frontal views of four exemplary embodiments of accessory devices 1800 for use by children, in accordance with representative embodiments of the present invention.

An accessory device in accordance with a representative embodiment of the present invention may be charged as a standalone device, or may share the power adapter and plugs of the handheld electronic device. Near field communication (NFC) solutions may combine data transmission and power supply directly with and from the main or host device.

The form factor of a representative embodiment of the present invention may be customized to any shape, color, material, as needed to, for example, represent popular children's characters, and the like, because, for example, Augmented Reality games and environments may be branded with leading product brand names.

The manufacturing of an accessory device in accordance with a representative embodiment of the present invention may comprise, for example, molding a case around one or more frames or magnets, followed by the insertion of a printed circuit board(s) in embodiments designed to have these features. The printed circuit board(s) may or may not be protected using any known means (e.g., enclosure, encapsulation, and the like). In various representative embodiments of the present invention, electrical wiring may be of a length sufficient to accommodate deformations of the accessory device of which it is a part. A power plug may be used, and may be slid through a channel molded into the structure of the accessory device, and the power plug may then be glued or clamped, onto the accessory device. A protective element (e.g., a film) may be glued inside of a compartment holding elements of the accessory device, in which case such protective sheeting may able to elongate, shrink, and deform.

Augmented Reality games enabled by a representative embodiment of the present invention include, but are not limited to, games that illustrate the power of breath, and those involving controlled respiration, as is known in Yoga, Chi Qong, Mana and such, through interaction with "mother nature", flowers, insects, etc., to help generate relaxation, concentration, and a sense of wellbeing. Such games may consist of marker or marker-less, location-based AR games where people and children may play alone, in multiplayer mode, or even gather, for example, in a park (via GPS positioning) where an AR application may superimpose details on a real-life, shared environment. Such games may be developed and implemented via a broad diversity of partnerships. The benefits of a "one size fits all" accessory device such as the various representative embodiments of the present invention described above may be highly desirable when it comes to sharing, borrowing, etc., especially when AR is implemented in the public, social space.

Figure 19:
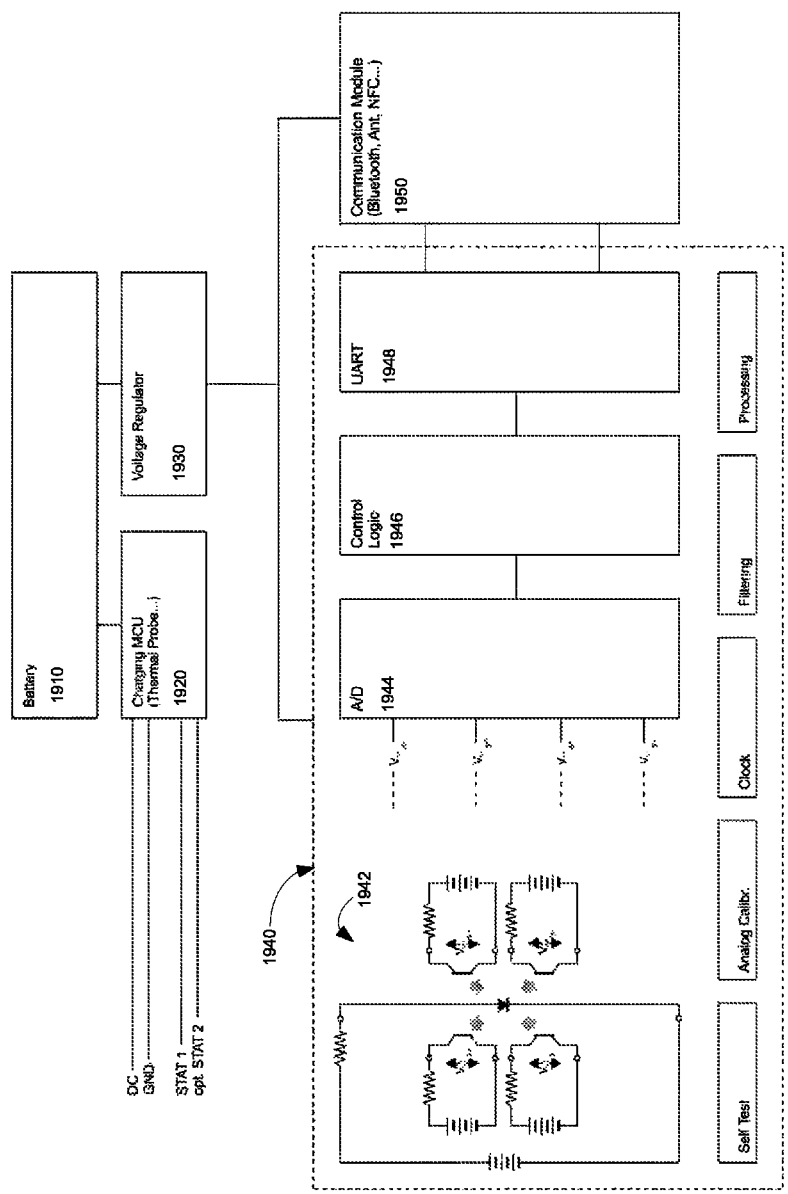
FIG. 19 is a block diagram illustrating an arrangement of the functionality of an exemplary accessory device that may correspond to, for example, the accessory devices of FIGS. 2-18D, in accordance with a representative embodiment of the present invention.

FIG. 19 is a block diagram illustrating an arrangement of the functionality of an exemplary accessory device 1900 that may correspond to, for example, the accessory devices of FIGS. 2-18D, in accordance with a representative embodiment of the present invention. The circuitry, logic, and code represented in FIG. 19 may, for example, be located on a rigid, semi-rigid, or flexible PCB such as the PCBs discussed above. The functionality of the accessory device 1900 includes a battery 1910, charging circuitry 1920, and voltage regulation circuitry 1930. As discussed above, the battery 1910 may be any suitable primary or rechargeable energy storage technology. As illustrated in FIG. 19, the charging circuitry 1920 manages power from a Universal Serial Bus (USB) interface to charge the battery 1910. The voltage regulator circuitry 1930 controls and regulates the power available from the battery 1910, and provides electrical power at one or more voltages suitable for the operation of the accessory device 1900.

The illustration of FIG. 19 also includes a sensor module 1940 comprising circuitry for sensing flow of a fluid such as human breath 1942, an analog-to-digital convertor 1944 for converting signals from the flow sensing circuitry 1942, and control logic 1944 for analyzing and encoding signals from the flow sensing circuitry 1942 for communication via the universal asynchronous receiver/transmitter 1948 to and from the wireless communication module 1950. The communication module 1950 then wirelessly links the accessory device 1900 with the host device to which the accessory device 1900 is mounted. It should be noted that the although the illustration of FIG. 19 shows particular functionality, this is for reasons of illustration and explanation of one possible embodiment of the present invention, and does not necessarily represent specific limitations of the present invention, as other circuitry and functionality may be employed without departing from the spirit and scope of the present invention.

Figure 20:
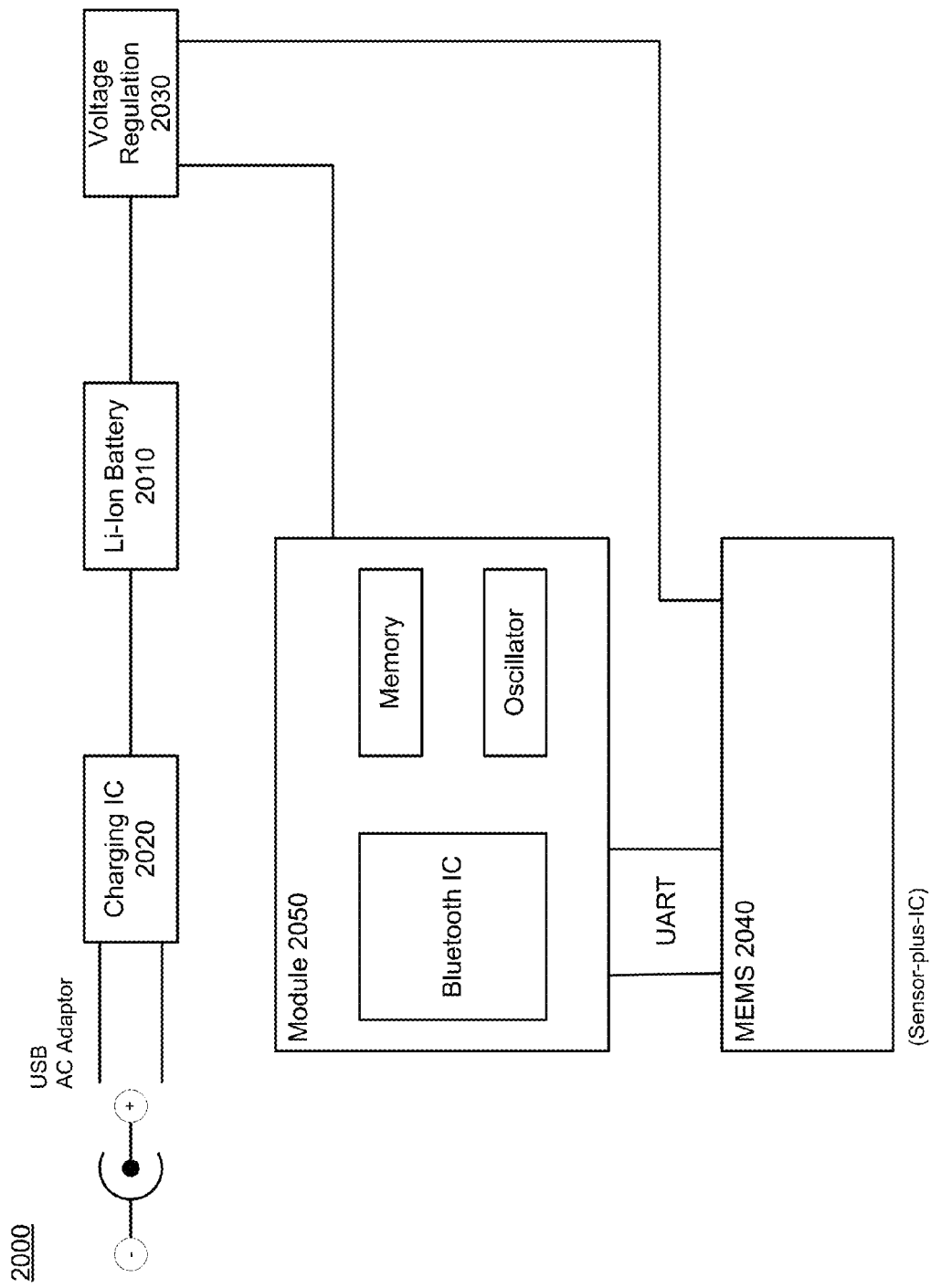
FIG. 20 is a block diagram illustrating an arrangement of the functionality of an exemplary accessory device that may correspond to the accessory devices of FIGS. 2-18D, in accordance with another representative embodiment of the present invention.

FIG. 20 is a block diagram illustrating an arrangement of the functionality of an exemplary accessory device 2000 that may correspond to the accessory devices of FIGS. 2-18D, in accordance with another representative embodiment of the present invention. As shown in FIG. 20, the accessory device 2000 includes a charging integrated circuit (IC) 2020, a lithium-ion battery 2010, and a voltage regulation circuit 2030, that may correspond, for example, to the charging circuitry 1920, the battery 1910, and the voltage regulation circuitry 1930 of FIG. 19, respectively. The illustration of FIG. 20 also includes a communication module 2050, and a micro-electromechanical system fluid flow sensor system 2040, which may correspond, for example, the communication module 1950 and the sensor module 1940, respectively, of FIG. 19.

Figure 21:
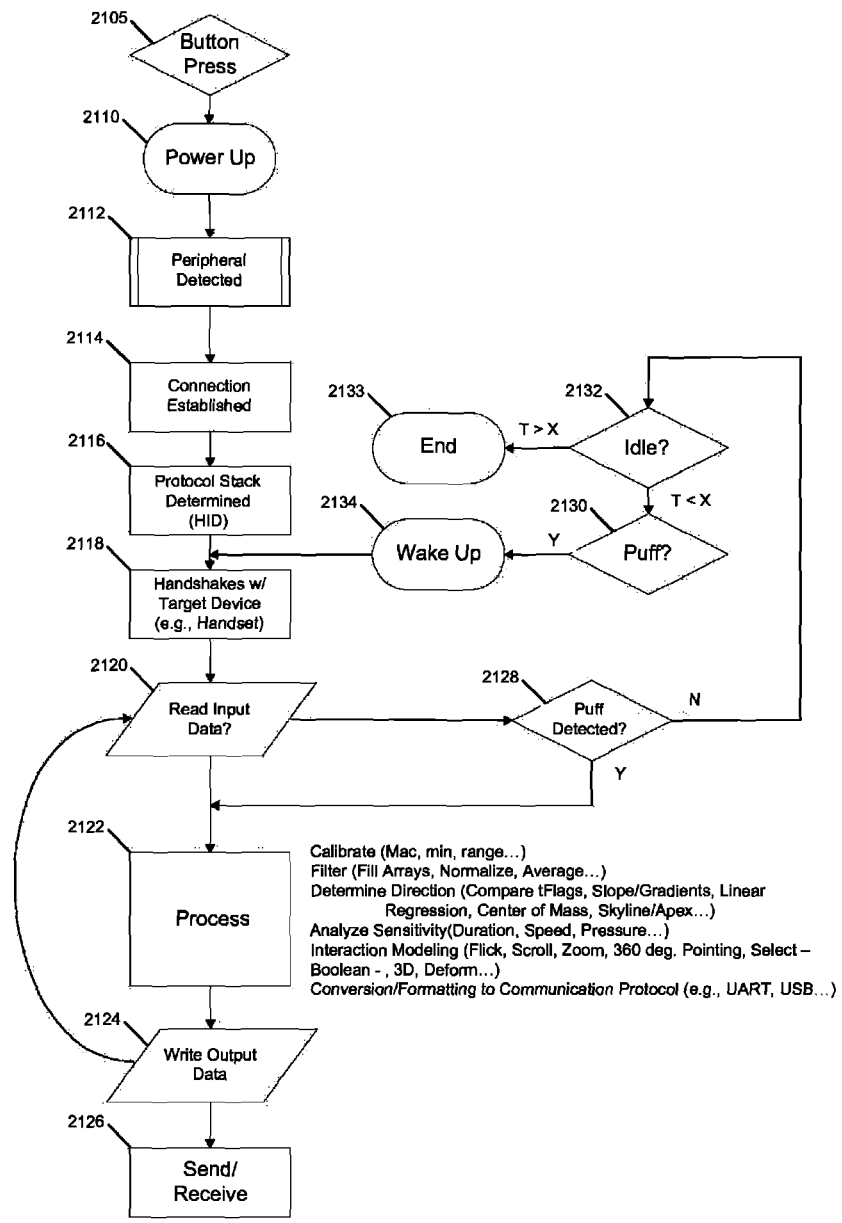
FIG. 21 is a flowchart illustrating an exemplary method of operating an accessory device that may correspond to the accessory devices of FIGS. 2-20, in accordance with a representative embodiment of the present invention.

FIG. 21 is a flowchart illustrating an exemplary method of operating an accessory device that may correspond to the accessory devices of FIGS. 2-20, in accordance with a representative embodiment of the present invention. The following may make reference to elements of FIG. 19 and FIG. 20. The method of FIG. 21 begins at block 2105, when a user presses a button on the accessory device, such as those described above in accordance with a representative embodiment of the present invention. The method then moves to 2010, where power is applied to the sensing, processing, and communication circuitry of the accessory device. Such activation of the circuitry of the accessory device may include initializing communication circuitry such as communication module 1950. Next, at block 2112, the accessory device may be detected by the host device to which it is mounted, and at block 2114, a communication path or connection may be established between the host device and accessory device. Such a connect may be wired or wireless, as previously described. The accessory device may then, at block 2116, determine a protocol stack to be used for communication, and may then, at block 2118, perform any suitable "handshake" operations with the host device (e.g., a handheld electronic device such as a smart phone).

Next, at block 2120, the accessory device may read input data from, for example, one or more sensors such as the sensor module 1940 of FIG. 19. If input data is received from the one or more sensors (e.g., data representing the flow of human breath), the method of FIG. 21 may then process the sensor data, at block 2122, and may, at block 2124, write the processed data in preparation for communication with the host device. If it is determined, at block 2124, that insufficient data or data without significance (e.g., data considered to be "noise") has been received from the one or more sensors at block 2120, the method loops to block 2120 to read input data from the one or more sensors. If, however, at block 2124, it is determined that sufficient data, or data having a particular significance has been received (e.g., flow of human breath above a certain level, or having a certain pattern), the method of FIG. 21 may then, at block 2126, communicate with the host device regarding the signals received from the sensor module and processed by the accessory device, and continue the method at block 2120.

If, at block 2120, insufficient or insignificant data is received, then the method may, at block 2128, determined than no flow of human breath has been detected for more than a certain amount of time (e.g., >X seconds), the method may then, at block 2132, determine whether the accessory device has been in an "Idle" state for greater than a certain length of time. If, at block 2132, it is determined that the accessory device has been "Idle" for greater than a certain amount of time (e.g., has not experienced appropriate user input), the circuitry of the accessory device may then, at block 2133, stop the method of FIG. 21 by, for example, powering down to save battery power. If, however, at block 2132, it is determined that the accessory device circuitry has not been "Idle" for at least the certain amount of time, the method of FIG. 21 may then, at block 2130, check for occurrence of a "puff" of flow of human breath of a user, and if a "puff" is detected, the method of FIG. 21 may then, at block 2134, "wake up" from "Idle" and commence establishing communication with the host device at block 2118.

Aspects of the present invention may be seen in an accessory device for an electronic user device. Such an accessory device may comprise circuitry for sensing flow of a fluid upon a portion of the accessory device, and circuitry for communicating with the user device to control the user device based on the flow of the fluid. Such a device may also comprise a body for maintaining proximity of the circuitry for sensing flow of the fluid and the circuitry for communicating with the user device, to the user device. In a representative embodiment of the present invention, the user device may fit within the body, and proximity of the circuitry for communicating with the user device may be maintained by mutual attraction of two or more magnets within the body. The fluid may comprise human breath, and the circuitry for sensing flow of the fluid may comprise a micro-electromechanical system (MEMS) fluid flow sensor. In some representative embodiments of the present invention, the body may comprise two or more openings to permit flow of fluid through the body. Power for operation of the circuitry for communicating with the user device may be controlled by flow of the fluid. In some representative embodiments of the present invention, communication between circuitry of the accessory device and the user device may be wireless, and the sensing of fluid flow may use optical signals.

Further aspects of the present invention may be found in an accessory device for an electronic user device. Such an accessory device may comprise at least one processor communicatively coupled to circuitry for sensing flow of a fluid upon a portion of the accessory device and to circuitry for communicating with the user device to control the user device based on the flow of the fluid. Such an embodiment may also comprise a body having a cavity to hold the circuitry for sensing flow of the fluid and the circuitry for communicating with the user device. The user device may fit within the body, and the body may comprise one or more openings for flow of fluid through the circuitry for sensing flow of the fluid and may maintain proximity of the circuitry for communicating with the user device, to the user device. In some representative embodiments of the present invention, proximity of the circuitry for communicating with the user device may be maintained by mutual attraction of two or more magnets within the body.

In a representative embodiment of the present invention, the fluid may comprise human breath, and the circuitry for sensing flow of the fluid may comprise a micro-electromechanical system (MEMS) fluid flow sensor. The body may comprise two or more openings to permit flow of fluid through the body, communication between circuitry of the accessory device and the user device may be wireless, and the sensing of fluid flow may use optical signals.

A further aspect of the present invention may be seen in a process of manufacturing an accessory device for an electronic user device. Such a process may comprise providing a body having a cavity comprising a first opening and a second opening into the cavity from outside of the body, and placing circuitry for sensing flow of the fluid within the cavity in alignment with the first opening and the second opening. The fluid may comprise human breath. The process may also comprise providing space within the body of appropriate dimensions to permit user insertion of the user device.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An accessory device for an electronic user device comprising a display screen, the accessory device comprising:
   circuitry for sensing flow of breath exhaled by a user upon a first opening in an external first surface of the accessory device;
   circuitry for communicating with the user device to control a user interface on the display screen of the user device based on the flow of breath; and
   a housing that encloses the circuitry for sensing flow and the circuitry for communicating with the user device, the housing of the accessory device being separate from and external to an external housing of the user device enclosing the circuitry of the user device, the housing of the accessory device comprising a first passageway connecting the first opening to a second opening at a second surface of the accessory device opposite the first surface to enable flow of exhaled breath striking the first surface to the circuitry for sensing flow, wherein the housing of the accessory device is configured to expose the display screen for viewing by the user and comprises an elastic material configured to hold the external housing of the user device within the elastic material of the housing of the accessory device, using tension of the elastic material.

2. The device of claim 1, wherein proximity of the circuitry for communicating with the user device, to the user device, is maintained by mutual attraction of two or more magnets within separate but adjacent portions of the housing of the accessory device.

3. The device of claim 1, wherein the circuitry for sensing flow comprises a micro-electromechanical system (MEMS) fluid flow sensor.

4. The device of claim 1, wherein the housing of the accessory device comprises a second passageway connecting a third opening on a third surface of the housing of the accessory device to a fourth opening on a fourth external surface of the housing of the accessory device to permit flow of exhaled breath to exhaust out of the housing of the accessory device.

5. The device of claim 1, wherein power for operation of the circuitry for communicating with the user device is controlled by the flow.

6. The device of claim 1, wherein communication of data and power between circuitry of the accessory device and the user device employs wireless near field communication (NFC).

7. The device of claim 1, wherein the sensing of flow uses optical signals.

8. The device of claim 1, wherein the user device comprises a smart phone, and the accessory device comprises circuitry that processes fluid flow sensing information to cause the user device to guide a user to breathe in a specific and timed sequence.

9. An accessory device for an electronic user device having a display screen, the accessory device comprising:
   at least one processor communicatively coupled to circuitry for sensing flow of breath exhaled upon a first opening of an external first surface of the accessory device and communicatively coupled to circuitry for communicating with the user device to control a user interface on the display screen of the user device based on the flow of the fluid; and
   a housing that encloses the circuitry for sensing flow and the circuitry for communicating with the user device, the housing of the accessory device being separate from and external to an external housing of the user device, the housing of the accessory device comprising:
      a cavity to hold the circuitry for sensing flow and the circuitry for communicating with the user device, the cavity comprising a second surface opposite the first surface, the second surface comprising a second opening, and
      a first passageway connecting the first opening to the second opening to enable flow of exhaled breath from the first opening of the first surface through the circuitry for sensing flow,
   wherein proximity with the user device of the circuitry for communicating with the user device is maintained by mutual attraction of two or more magnets within separate but adjacent portions of the housing of the accessory device.

10. The device of claim 9, wherein the breath is exhaled from the mouth of the user directly upon the first opening.

11. The device of claim 9, wherein the circuitry for sensing flow comprises a micro-electromechanical system (MEMS) fluid flow sensor.

12. The device of claim 9, wherein the housing of the accessory device comprises a second passageway connecting a third opening on a third surface of the housing of the accessory device to a fourth opening on a fourth external surface of the housing of the accessory device to permit flow of exhaled breath to exhaust out of the housing of the accessory device.

13. The device of claim 9, wherein communication of data and power between circuitry of the accessory device and the user device employs wireless near field communication (NFC).

14. The device of claim 9, wherein the sensing of flow uses optical signals.

15. A process of manufacturing an accessory device for an electronic user device comprising a display screen, the process comprising:

providing a housing comprising a first opening in an external first surface of the housing coupled by a first passageway to a second opening on a second surface of an internal cavity, the second surface opposite the first surface, and a third opening on a third surface of the cavity opposite the second surface, the third opening coupled by a second passageway to a fourth opening on an external fourth surface of the housing, to permit flow of exhaled breath striking the first surface outside of the housing through the housing and through a fluid flow sensor, wherein the housing of the accessory device is configured to expose the display screen for viewing by the user and is molded of an elastic material configured to hold the housing of the user device within the elastic material of the housing of the accessory device using tension of the elastic material; and placing circuitry comprising the fluid flow sensor for sensing flow of exhaled breath and circuitry for communicating with the user device within the cavity in alignment with the second opening and the third opening to enable flow of the fluid into the housing through the first opening, through the fluid flow sensor, and out of the housing through the fourth opening.

* * * * *